United States Patent
Song et al.

(10) Patent No.: US 8,885,117 B2
(45) Date of Patent: Nov. 11, 2014

(54) DISPLAY APPARATUS HAVING PARTICULAR DISPLAY REGIONS

(75) Inventors: HongSung Song, Goyang-si (KR); JoungMoo Ko, Goyang-si (KR); YoungMin Kweon, Gumi-si (KR); YongGi Son, Gyeongbuk (KR); ChangSoo Jang, Wonju-si (KR)

(73) Assignee: LG Display Co., Ltd., Seoul (KR)

( * ) Notice: Subject to any disclaimer, the term of this patent is extended or adjusted under 35 U.S.C. 154(b) by 250 days.

(21) Appl. No.: 13/596,224

(22) Filed: Aug. 28, 2012

(65) Prior Publication Data

US 2013/0082989 A1 Apr. 4, 2013

(30) Foreign Application Priority Data

Sep. 29, 2011 (KR) .................. 10-2011-0099363

(51) Int. Cl.
| | | |
|---|---|---|
| G02F 1/1333 | (2006.01) | |
| G02F 1/1335 | (2006.01) | |
| G09G 3/04 | (2006.01) | |
| G09G 5/00 | (2006.01) | |
| G09G 3/36 | (2006.01) | |
| G02F 1/13 | (2006.01) | |
| G02F 1/133 | (2006.01) | |

(52) U.S. Cl.
CPC .......... *G09G 3/36* (2013.01); *G09G 2310/0221* (2013.01); *G02F 1/1323* (2013.01); *G02F 1/13306* (2013.01)
USPC ................... 349/58; 349/84; 349/16; 349/61; 345/214; 345/33

(58) Field of Classification Search
CPC ...................... G02F 1/133308; G02F 1/133608; G02F 1/13452; G02F 1/133615; G02F 1/1334; G02F 1/133603; G02F 1/133512; G02F 1/133377; G02F 1/133604; G02F 1/133345; E06B 2009/2464
USPC ..................... 349/58, 84, 16, 61; 345/214, 33
See application file for complete search history.

(56) References Cited

U.S. PATENT DOCUMENTS

| | | | |
|---|---|---|---|
| 6,529,257 B1 | 3/2003 | Nakano | |
| 7,633,473 B2 * | 12/2009 | Uh et al. | ......................... 345/87 |
| 2005/0073470 A1 | 4/2005 | Nose et al. | |

FOREIGN PATENT DOCUMENTS

| | | |
|---|---|---|
| CN | 1293380 A | 5/2001 |
| CN | 1604179 A | 4/2005 |

(Continued)

OTHER PUBLICATIONS

Office Action issued in counterpart Chinese Patent Application No. 201210288642.7 dated May 15, 2014.

*Primary Examiner* — Mike Qi
(74) *Attorney, Agent, or Firm* — Morgan, Lewis & Bockius LLP

(57) ABSTRACT

A display apparatus having a thin thickness and improved esthetic sense is disclosed. The display apparatus comprises a display panel including an upper substrate having a signal line to which gate and data signals are supplied, and at least one lower substrate bonded to the upper substrate; and a panel support member supporting the display panel to externally expose an entire upper surface of the display panel, wherein the display panel includes a display portion having a main display region, a sub display region having an area smaller than that of the main display region, and a boundary region dividing the main display region and the sub display region from each other; and a periphery portion surrounding the display portion.

20 Claims, 19 Drawing Sheets

(56) References Cited

FOREIGN PATENT DOCUMENTS

| | | | |
|---|---|---|---|
| CN | 1766955 A | 5/2006 |
| CN | 1790139 A | 6/2006 |
| EP | 1672411 A2 | 6/2006 |
| WO | 2010/024505 A1 | 12/2008 |

* cited by examiner

DISPLAY APPARATUS HAVING PARTICULAR DISPLAY REGIONS

CROSS REFERENCE TO RELATED APPLICATIONS

This application claims the benefit of the Korean Patent Application No. 10-2011-0099363 filed on Sep. 29, 2011, which is hereby incorporated by reference for all purposes as if fully set forth herein.

BACKGROUND OF THE INVENTION

1. Field of the Invention

The present invention relates to a display apparatus, and more particularly, to a display apparatus having a thin thickness and a design improved in a sense of beauty.

2. Discussion of the Related Art

Recently, various display devices, which can substitute for a cathode ray tube which is a display device in the early stage, have been developed. Examples of the display devices include a liquid crystal display device, a plasma display panel, and an organic light emitting display device.

The display device has realized a large size by reducing weight and volume and has been greatly developed in view of quality such as response speed or picture quality owing to the continuous research and development.

In addition to the research and development in technical aspects such as response speed or picture quality, the research and development in design aspects of products that can appeal to consumers is ongoing. In other words, the development of a design having improved sense of beauty and minimizing the thickness of the display device is ongoing, which can stimulate purchasing by appealing to consumers.

However, the display device developed until now has limitation in minimizing or reducing the thickness and increasing a sense of beauty due to its structural characteristics. Hereinafter, the limitation of the display device according to the related art will be described with reference to the accompanying drawing.

FIG. 1 is a cross-sectional view illustrating a display device according to the related art.

Referring to FIG. 1, the display device according to the related art includes a display panel 10, a panel driver 20, and a front set cover 30.

The display panel 10 includes a lower substrate 12 and an upper substrate 14.

On the lower substrate 12, gate lines are formed to cross data lines, thereby defining a pixel region. A thin film transistor is formed in a region where the gate lines cross the data lines, and a pixel electrode connected with the thin film transistor is formed in the pixel region. A pad portion in the periphery at one side of the lower substrate 12 is externally exposed to connect with a panel driver 20 that applies a signal to the gate and data lines.

The upper substrate 14 is formed to have an area relatively smaller than that of the lower substrate 12, and then is bonded to the other lower substrate 12 except for the pad portion of the lower substrate 12.

The panel driver 20 is connected to the pad portion of the lower substrate 12 externally exposed, and provides a signal to the gate and data lines.

The front set cover 30 is formed to cover a periphery region of the display panel 10 except for a display portion of the display panel 10. The front set cover 30 is to surround the panel driver 20 externally exposed, and also surround the periphery region of the other display panel 10.

As described above, as the display device of the related art includes the front set cover 30 surrounding the periphery region of the display panel 10, the following problems may occur.

First of all, due to the front set cover 30 formed above the upper substrate 14, the thickness of the display device is increased and a width of a bezel is increased to deteriorate a sense of beauty.

Also, since the front set cover 30 is formed above the periphery region of the upper substrate 14, step difference occurs on a front surface of the display device, whereby a sense of beauty is deteriorated.

SUMMARY OF THE INVENTION

Accordingly, the present invention is directed to a display apparatus that substantially obviates one or more problems due to limitations and disadvantages of the related art.

An advantage of the present invention is to provide a display apparatus in which an entire upper surface of a display panel is externally exposed to obtain a thin thickness and improved sense of beauty.

Another advantage of the present invention is to provide a display apparatus in which a display portion is divided into a main display region and a sub display region to display various kinds of additional information in the sub display region as well as main image in the main display region.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display apparatus according to the present invention comprises a display panel including an upper substrate having a signal line to which gate and data signals are supplied, and at least one lower substrate bonded to the upper substrate; and a panel support member supporting the display panel to externally expose an entire upper surface of the display panel, wherein the display panel includes a display portion having a main display region, a sub display region having an area smaller than that of the main display region, and a boundary region dividing the main display region and the sub display region from each other; and a periphery portion surrounding the display portion.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Figure 1:
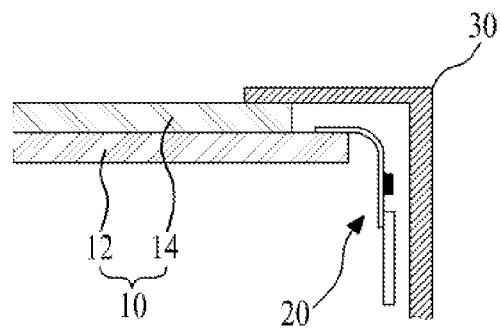
FIG. 1 is a cross-sectional view illustrating a display apparatus according to the related art.
Figure 2:
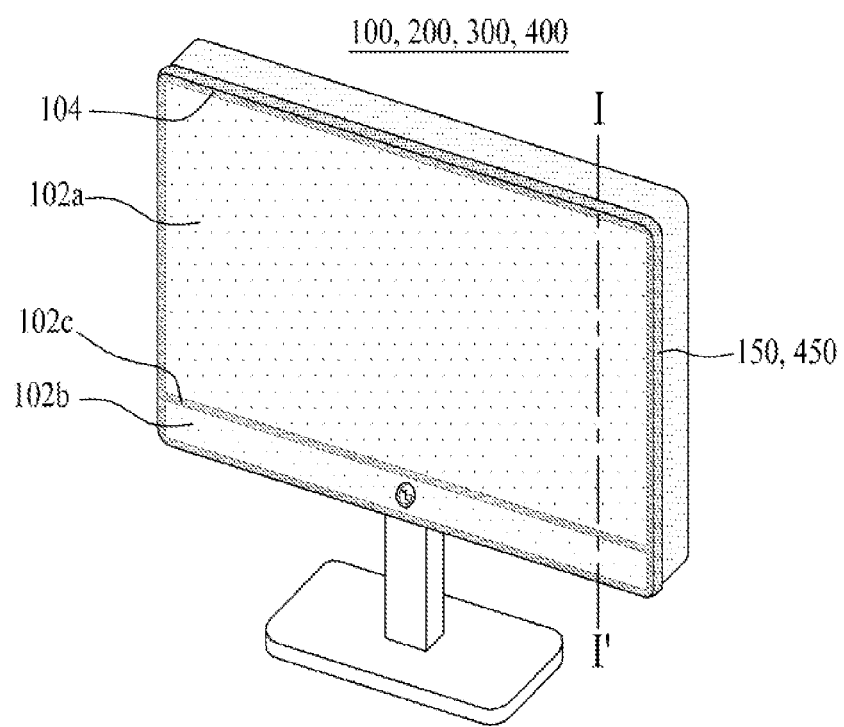
FIG. 2 is a diagram illustrating a display apparatus according to the first to fourth embodiments of the present invention.
Figure 3:
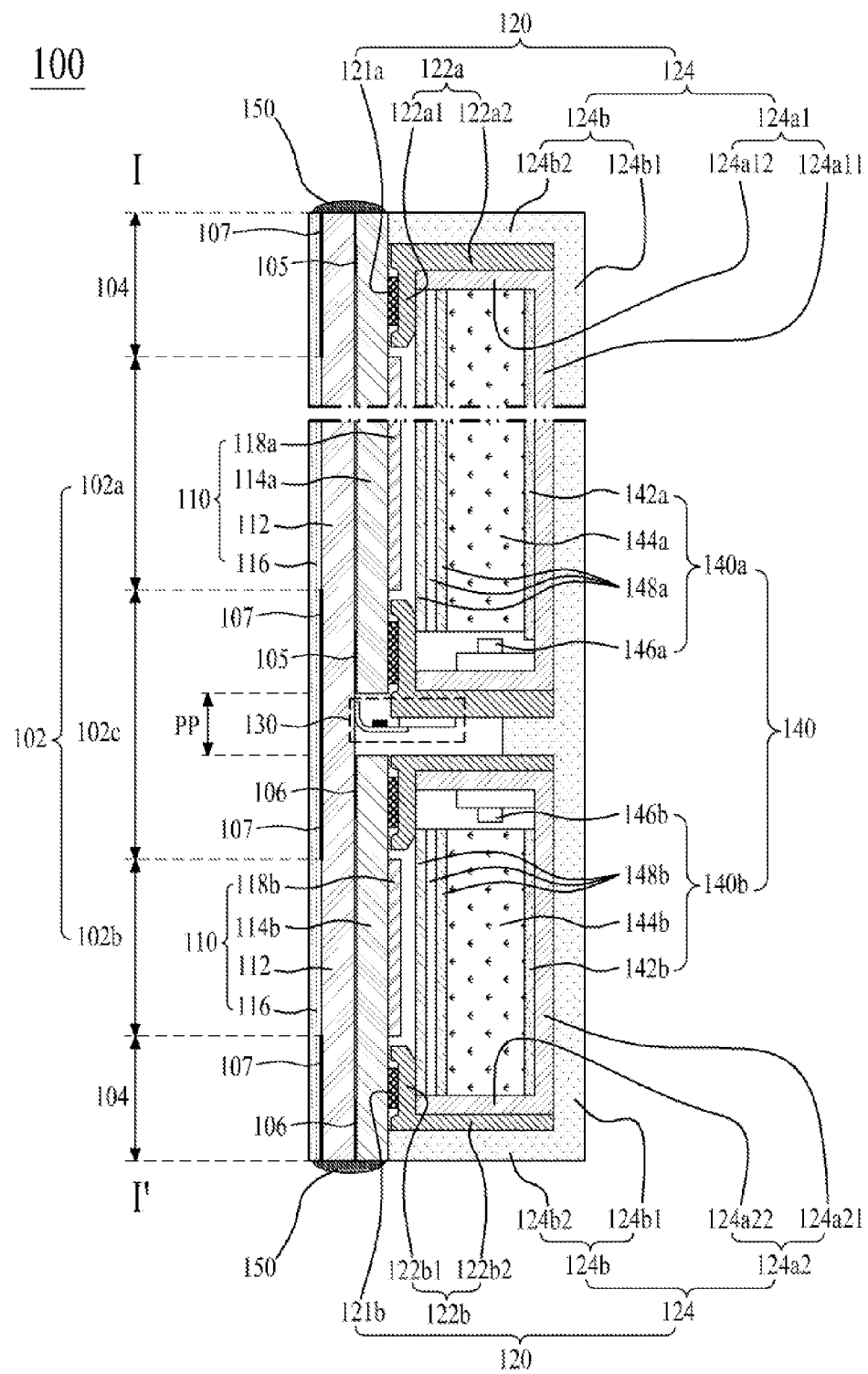
FIG. 3 is a cross-sectional view taken along line I-I' of FIG. 2, illustrating a display apparatus according to the first embodiment of the present invention.

FIG. 2 is a diagram illustrating a display apparatus according to the first to fourth embodiments of the present invention, and FIG. 3 is a cross-sectional view taken along line I-I' of FIG. 2, illustrating a display apparatus according to the first embodiment of the present invention.

Referring to FIGS. 2 and 3, the display apparatus 100 according to the first embodiment of the present invention includes a display panel 110 and a panel support member 120 supporting the display panel 110 to externally expose an entire upper surface of the display panel 110.

The display panel 110 includes a display portion 102 and a periphery portion 104.

The display portion 102 includes a main display region 102a, a sub display region 102b having an area smaller than that of the main display region 102a, and a boundary region 102c between the main display region 102a and the sub display region 102b.

The main display region 102a becomes a main screen for displaying main image such as moving image or still image depending on driving of the display panel 110. The main display region 102a has screen resolution of at least 1920× 1080.

The sub display region 102b can be arranged below the main display region 102a based on a vertical direction. This sub display region 102b becomes a sub screen for displaying sub image such as additional information of at least one of text, symbol, figure, and number in accordance with driving of the display panel 110. At this time, the additional information may be manufacturer logo of the display apparatus, advertisements, caption information of moving image, volume information, channel information, and time information.

The boundary region 102c is formed in a predetermined color between the main display region 102a and the sub display region 102b to divide the main display region 102a and the sub display region 102b from each other. At this time, the boundary region 102c may have a single or mixed color, and for example may have a black color.

The periphery portion 104 is formed at a corner portion of the display panel 110. The display portion 102 is defined by the periphery portion surrounding the display portion 102. The periphery portion 104 has a single or mixed color, or has the same color as that of the boundary region 102c.

As described above, the display panel 110 that includes the display portion 102 and the periphery portion 104 includes an upper substrate 112 bonded to first and second lower substrates 114a and 114b to face them by interposing a liquid crystal layer (not shown) therebetween, an upper polarizing member 116 attached to the upper substrate 112, and first and second lower polarizing members 118a and 118b attached to the first and second lower substrates 114a and 114b.

The upper substrate 112 is a thin film transistor array substrate, and includes a plurality of pixels (not shown) formed per region where a plurality of gate lines (not shown) cross a plurality of data lines (not shown). Each pixel may include a thin film transistor (not shown) connected to the gate and data lines, a pixel electrode connected to the thin film transistor, and a common electrode formed near the pixel electrode to receive a common voltage. At this time, the common electrode may be formed in the first lower substrate 114a or second lower substrates 114b depending a driving mode of the liquid crystal layer. The upper substrate 112 forms electric field corresponding to a differential voltage between a data voltage and a common voltage, which are applied to each pixel, and adjusts light transmittance of a color light transmitting the first and second lower substrates 114a and 114b and the liquid crystal layer, whereby a predetermined color image is displayed in the main display region 102a and the sub display region 102b of the display panel 110.

Meanwhile, each pixel of the sub display region 102b may have a size different from that of each pixel of the main display region 102a. For example, since the sub display region 102b displays the additional information, it does not require high resolution unlike the main display region 102a, whereby each pixel of the sub display region 102b may be formed to have a size at least three times greater than that of each pixel of the main display region 102a. To this end, it is preferable that the size of each pixel of the sub display region 102b is increased in a length direction of the data line.

Meanwhile, a gate driving circuit (not shown) for supplying a gate (or scan) signal to the gate line formed in each of the main display region 102a and the sub display region 102b is formed on a back surface of the upper substrate 112. The gate driving circuit is formed in a region corresponding to the boundary region 102c. The gate driving circuit generates a gate signal in response to a gate control signal provided from an external timing controller and supplies the generated gate signal to the gate line formed in each of the main display region 102a and the sub display region 102b.

A pad portion PP to which various signals for driving each pixel formed in each of the main display region 102a and the sub display region 102b are supplied is provided on the back surface of the upper substrate 112 corresponding to the boundary region 102c. In other words, the pad portion PP is arranged on the back surface of the upper substrate 112 between the first and second lower substrates 114a and 114b to overlap the boundary region 102c. A panel driver 130 for driving each pixel of the main display region 102a and the sub display region 102b is formed in the pad portion PP. The panel driver 130 will later be described in more detail.

The first lower substrate 114a is a color filter array substrate, and is bonded to the upper substrate 112 by interposing the liquid crystal layer therebetween, to include the main display region 102a. A first sealing member 105 is formed at a corner portion of the first lower substrate 114a to bond the upper substrate 112 and the first lower substrate 114a.

The second lower substrate 114b is a color filter array substrate, and is bonded to the upper substrate 112 by interposing the liquid crystal layer therebetween, to include the sub display region 102b. A second sealing member 106 is formed at a corner portion of the second lower substrate 114b to bond the upper substrate 112 and the second lower substrate 114b.

Each of the first and second lower substrates 114a and 114b includes black matrix (not shown) for defining a pixel region corresponding to each pixel formed in the main display region 102a and the sub display region 102b of the upper substrate 112, and a color filter (not shown) formed in the pixel region. A common electrode (not shown) to which a common voltage is supplied depending on a driving mode of the liquid crystal layer, may be formed in the lower substrates 114a and 114b.

Meanwhile, the upper substrate 112 and the lower substrates 114a and 114b may be formed by various formats known in the art in accordance with a driving mode of the liquid crystal layer, for example, a twisted nematic (TN) mode, a vertical alignment (VA) mode, an in plane switching (IPS) mode and a fringe field switching (FFS) mode.

The first lower polarizing member 118a is attached to the back surface of the first lower substrate 114a and polarizes light irradiated from the back light unit 140 to the first lower substrate 114a.

The second lower polarizing member 118b is attached to the back surface of the second lower substrate 114b and polarizes light irradiated from the back light unit 140 to the second lower substrate 114b.

Figure 4A:
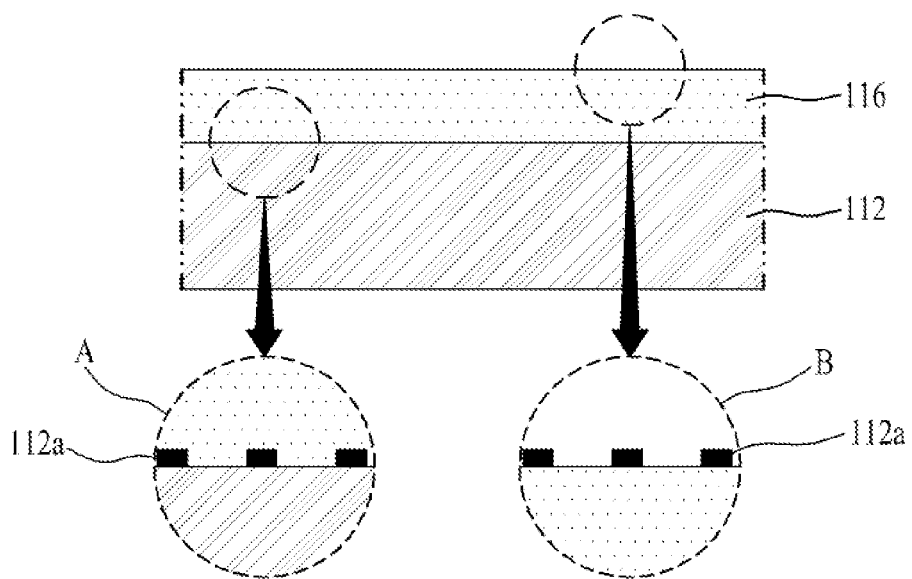
FIGS. 4a and 4b are diagrams illustrating an upper polarizing member shown in FIG. 3.

The upper polarizing member 116 according to one embodiment of the present invention, as shown in FIG. 4a, includes an upper polarizing film fixed (or attached) to the upper surface of the upper substrate 112 to polarize color light transmitting the upper substrate 112.

Figure 4B:
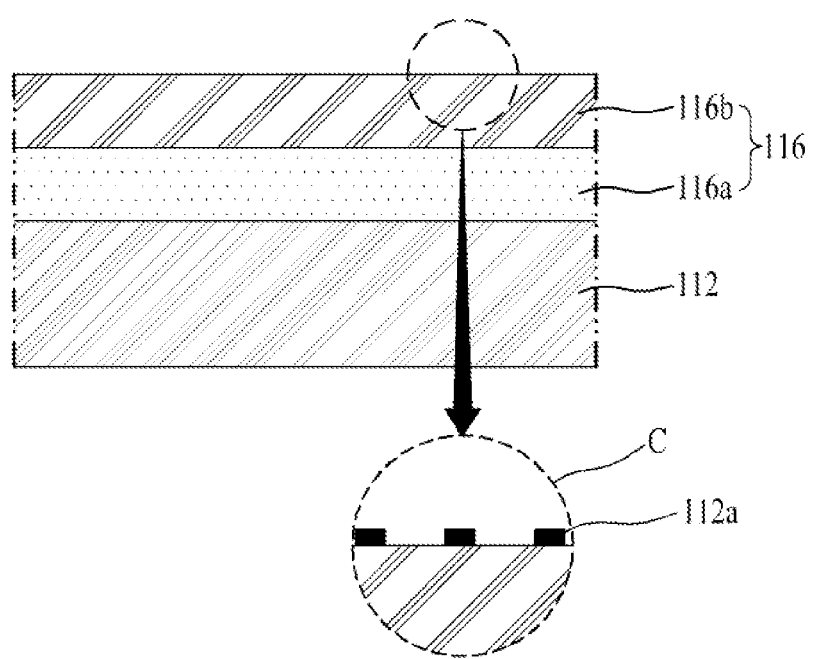

The upper polarizing member 116 according to another embodiment of the present invention, as shown in FIG. 4b, includes an upper polarizing film 116a fixed (or attached) to the upper surface of the upper substrate 112 to polarize color light transmitting the upper substrate 112, and a stereoscopic optical member 116b fixed (or attached) to the upper polarizing film 116a to convert two-dimensional image displayed in the display panel 110 into three-dimensional image. For example, the stereoscopic optical member 116b may be a retarder film that separates two-dimensional image, that is, left image and/or right image into different polarizing states.

Meanwhile, all the signal lines formed on the upper substrate 112 of the aforementioned display panel 110 may be made of a metal material. Thus, an external light can be reflected by the signal lines. In order to avoid this, the display panel 110 may further include a light shielding pattern 112a formed on the upper surface of the upper substrate 112, the upper polarizing films 116 and 116a or the stereoscopic optical member 116b to prevent external light from entering towards the signal line formed on the upper substrate 112, as shown in enlarged views "A", "B" or "C" shown in FIG. 4a or 4b. The light shielding pattern 112a is formed to overlap all the signal lines formed on the upper substrate 112. The light shielding pattern 112a can be formed by a printing process.

As described above, the display panel 110 includes the display portion 102 and the periphery portion 104 through bonding of the upper substrate 112 and the lower substrates 114a and 114b. At this time, the display portion 102 includes the main display region 102a corresponding to the bonded upper substrate 112 and first lower substrate 114a, the sub display region 102b corresponding to the bonded upper substrate 112 and second lower substrate 114b, and the boundary region 102c including the pad portion PP between the first and second lower substrates 114a and 114b.

The periphery portion 104 is formed at the corner portion of the upper substrate 112 to surround the display portion 102.

The periphery portion 104 according to one embodiment of the present invention may be a region overlapped with a light shielding layer (or black matrix) formed at the corner portion of the upper substrate 112 or the lower substrates 114a and 114b. In this case, the periphery portion 104 according to one embodiment has a black color depending on the color of the corner light shielding layer.

The periphery portion 104 according to another embodiment of the present invention may be a region overlapped with a coating layer 107 formed at the corner portion of the upper substrate 112 or the upper polarizing member 116. In this case, the periphery portion 104 according to another embodiment may have a black color or predetermined color depending on the color of the coating layer 107.

As described above, the periphery portion 104 surrounds each of the upper side, the lower side, the left side and the right side of the display portion 102, and widths of the upper side, the lower side, the left side and the right side of the periphery portion 104 may be the same as or different from one another.

Figure 5A:
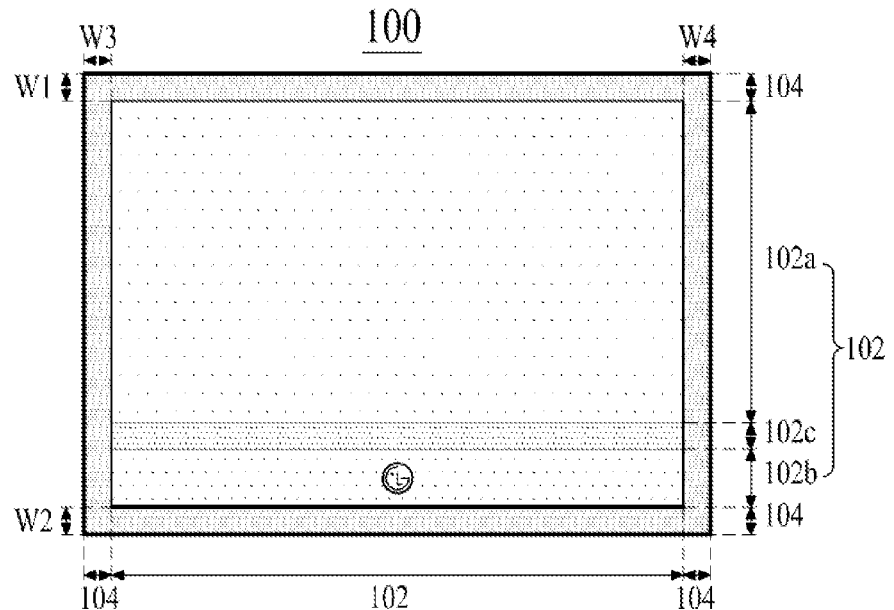
FIGS. 5a to 5c are diagrams illustrating a display portion and a periphery portion shown in FIG. 3.
Figure 5B:
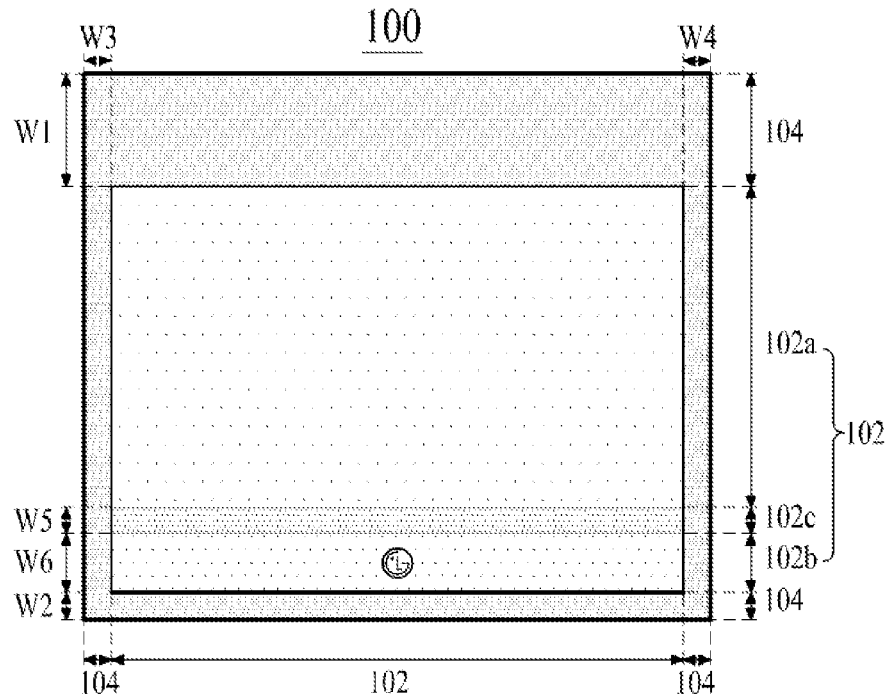
Figure 5C:
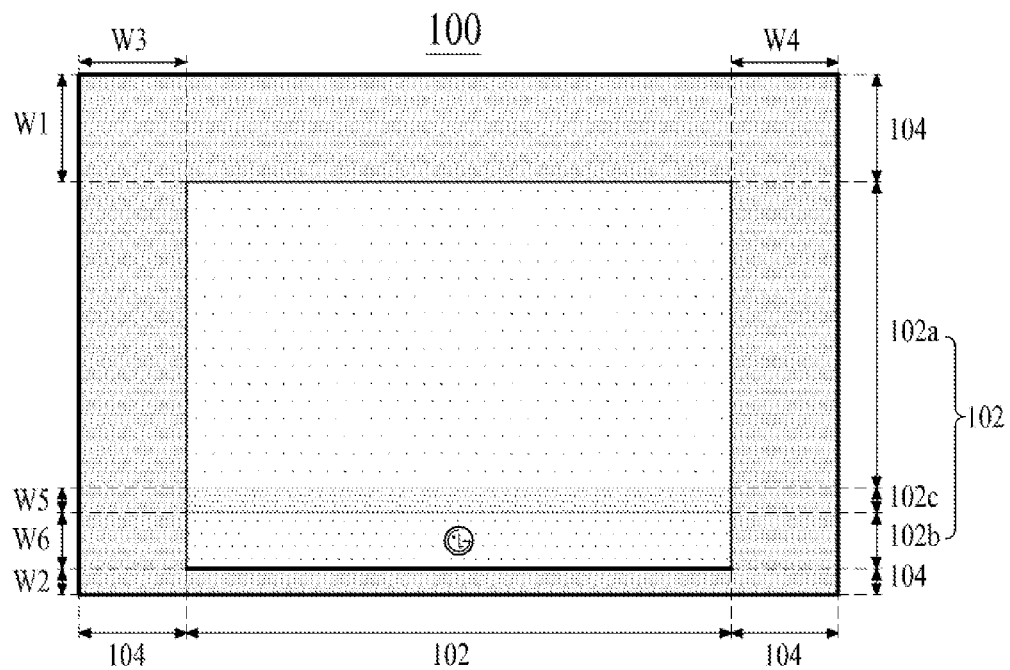

FIGS. 5a to 5c are diagrams illustrating a display portion and a periphery portion shown in FIG. 3.

In one embodiment of the present invention, as shown in FIG. 5a, the widths W1, W2, W3 and W4 of the upper side, the lower side, the left side and the right side of the periphery portion 104 may be the same as one another. In this case, the display panel 110 has the periphery portion 104 of a symmetrical structure in all directions based on the display portion 102.

In another embodiment of the present invention, as shown in FIG. 5b, the widths W2, W3 and W4 of the lower side, the left side and the right side of the periphery portion 104 may be the same as one another, and the width W1 of the upper side of the periphery portion 104 may be formed by sum (W2+W5+W6) of the lower width W2 of the periphery portion 104, the width W5 of the boundary region 102c and the width W6 of the sub display portion 102b. In this case, the periphery portion 104 has a black color. Accordingly, the display panel 110 has the periphery portion 104 of an up and down symmetrical structure and a left and right symmetrical structure based on the main display region 102a when the sub display region 102b is not driven.

In other embodiment of the present invention, as shown in FIG. 5c, the widths W1, W3 and W4 of the upper side, the left side and the right side of the periphery portion 104 may be the same as one another, and the width W2 of the lower side of the periphery portion 104 may be formed by a width (W1−W5−W6) narrower than the upper width W1 of the periphery portion 104. In this case, the periphery portion 104 has a black color. Accordingly, the display panel 110 has the periphery portion 104 of an up and down and left and right symmetrical structure based on the main display region 102a when the sub display region 102b is not driven.

Figure 6A:
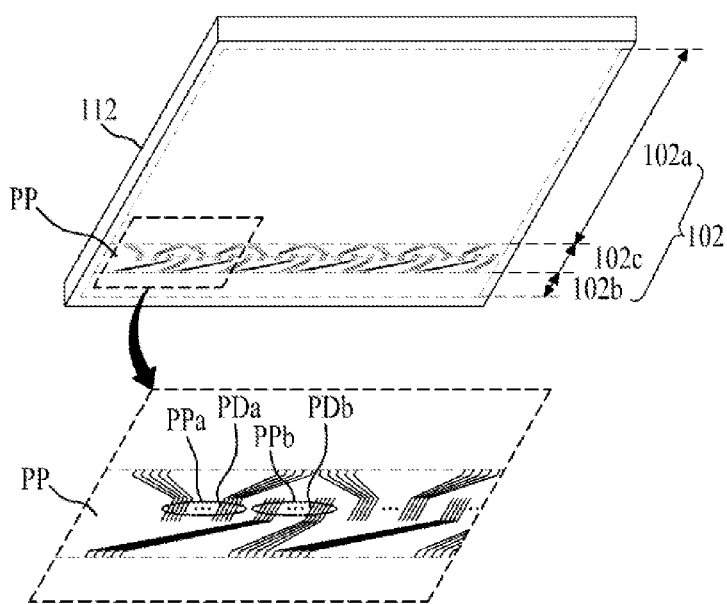
FIGS. 6a and 6b are diagrams illustrating a pad portion shown in FIG. 3.
Figure 6B:
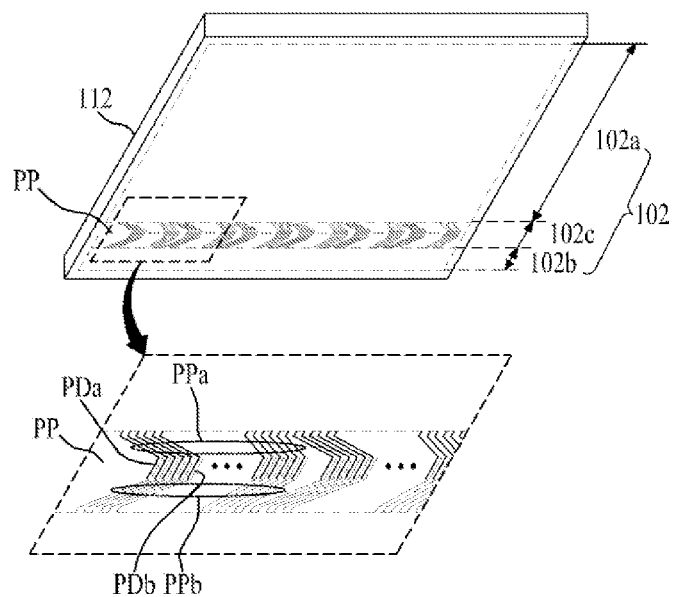

FIGS. 6a and 6b are diagrams illustrating a pad portion shown in FIG. 3.

The pad portion PP is prepared in a region between the first and second lower substrates 114a and 114b to overlap the boundary region 102c of the display portion 102.

The pad portion PP according to the first embodiment of the present invention, as shown in FIG. 6a, includes a plurality of first connection portions PPa that include a plurality of first pads PDa and a plurality of second connection portions PPb that include a plurality of second pads PDb.

Each of the plurality of first connection portions PPa includes a plurality of first pads PDa connected to the signal line (for example, data line) of the main display region 102a. Each of the plurality of first pads PDa is connected to the signal line (for example, data line) of the main display region 102a through a first link line.

Each of the plurality of second connection portions PPb includes a plurality of second pads PDb connected to the signal line (for example, data line) of the sub display region 102b. At this time, each of the plurality of second connection portions PPb is formed between the respective first connection portions PPa. Each of the plurality of second pads PDb is connected to the signal line (for example, data line) of the sub display region 102b through a second link line.

The pad portion PP according to the second embodiment of the present invention, as shown in FIG. 6b, includes a plurality of first connection portions PPa that include a plurality of first pads PDa and a plurality of second connection portions PPb that include a plurality of second pads PDb formed between the respective first pads PDa. Since the pad portion PP according to the second embodiment as above is the same as that according to the first embodiment except that each of the plurality of second pads PDb is formed between the respective first pads PDa, its repeated description will be omitted.

As described above, the pad portion PP according to the first or second embodiment of the present invention is connected to the panel driver 130 and transfers the signal provided from the panel driver 130 to each pixel of the main display region 102a and the sub display region 102b.

Referring to FIG. 3 again, the panel driver 130 is connected to the pad portion PP and independently drives each pixel of the main display region 102a and the sub display region 102b.

Figure 7A:
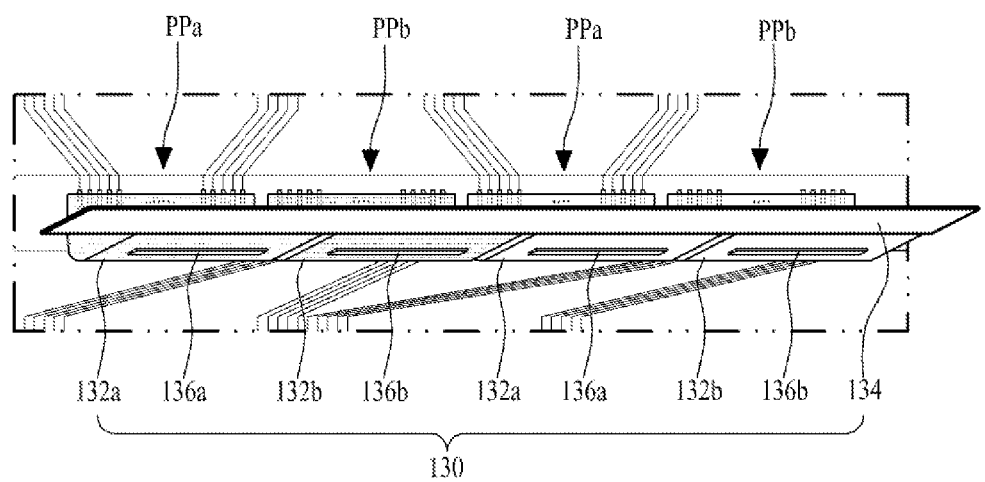
FIGS. 7a and 7b are diagrams illustrating a panel driver shown in FIG. 3.

In the case that the display panel 110 includes the pad portion PP according to the first embodiment shown in FIG. 6a, the panel driver 130, as shown in FIG. 7a, includes a plurality of first and second circuit films 132a and 132b connected to the pad portion PP, and a printed circuit board 134 connected to the plurality of first and second circuit films 132a and 132b.

Each of the plurality of first circuit films 132a is electrically connected to each of the first connection portions PPa of the pad portion PP according to the first embodiment. Also, each of the plurality of first circuit films 132a is electrically connected to the printed circuit board 134. To this end, each of the plurality of first circuit films 132a includes a plurality of first input pads (not shown) connected to the printed circuit board 134 and a plurality of first output pads (not shown) connected to the first pads PDa of the first connection portions PPa. A first data driving integrated circuit 136a is packaged in each of the plurality of first circuit films 132a.

The first data driving integrated circuit 136a converts a digital data signal provided from a timing controller (not shown) packaged in the printed circuit board 134 through the first circuit film 132a into an analog data signal and supplies the converted signal to the data line of the main display region 102a.

Each of the plurality of second circuit films 132b is electrically connected to each of the second connection portions PPb of the pad portion PP according to the first embodiment. Also, each of the plurality of second circuit films 132b is electrically connected to the printed circuit board 134. To this end, each of the plurality of second circuit films 132b includes a plurality of second input pads (not shown) connected to the printed circuit board 134 and a plurality of second output pads (not shown) connected to the second pads PDb of the second connection portions PPb. A second data driving integrated circuit 136b is packaged in each of the plurality of second circuit films 132b.

The second data driving integrated circuit 136b converts a digital data signal provided from a timing controller (not shown) packaged in the printed circuit board 134 through the second circuit film 132b into an analog data signal and supplies the converted signal to the data line of the sub display region 102b.

The printed circuit board 134 is electrically connected to the plurality of circuit films 132a and 132b and provides various signals for displaying image in the main display region 102a and the sub display region 102b of the display panel 110. This printed circuit board 134 is arranged in a space between the first and second lower substrates 114a and 114b to overlap the boundary region 102c.

A timing controller (not shown) for driving each pixel of the main display region 102a and the sub display region 102b, various power circuits (not shown), and a memory device (not shown) are packaged in the printed circuit board 134. At this time, the timing controller controls driving of the gate driving circuit formed in the upper substrate 112 through a control line (not shown) formed in the upper substrate 112 and the plurality of circuit films 132a and 132b. The gate driving circuit is formed at the left side and/or right side of each of the main display region 102a and the sub display region 102b, so that it may be connected to the gate line by the process of manufacturing the thin film transistor of the upper substrate 112. The gate driving circuit sequentially drives the gate lines formed at the main display region 102a and the sub display region 102b under the control of the timing controller.

Each of the plurality of first and second circuit films 132a and 132b is attached to the pad portion PP and the printed circuit board 134 by a tape automated bonding (TAB) process, and may be made of tape carrier package (TCP) or chip one flexible board or chip on film (COF). Accordingly, the display panel 110 is electrically connected to the printed circuit board 134 through the plurality of first and second circuit films 132a and 132b.

Figure 7B:
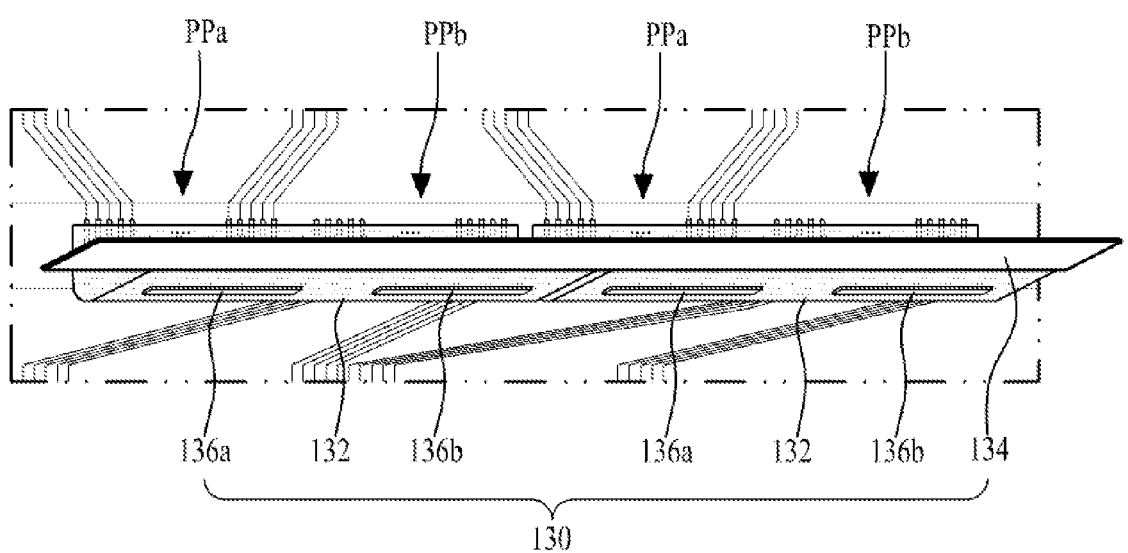

Although the aforementioned panel driver 130 includes the first and second circuit films 132a and 132b connected to each of the first and second connection portions PPa and PPb of the pad portion PP, the present invention is not limited to this example and the pad driver 130 may include a plurality of circuit films 132 simultaneously connected to a pair of the first and second connection portions PPa and PPb adjacent to each other, as shown in FIG. 7b. The first and second data driving integrated circuits 136a and 136b are packaged in each of the plurality of circuit films 132.

Meanwhile, the plurality of circuit films 132 shown in FIG. 7b may equally be applied to the pad portion PP according to the second embodiment shown in FIG. 6b. In this case, the first and second output pads of each of the circuit films 132 are alternately formed to correspond to the pads PDa and PDb of each of the first and second connection portions PPa and PPb.

The aforementioned display panel 110 displays main image and/or sub image (or additional information) in accordance with pixel driving of the main display region 102a and/or the sub display region 102b based on driving of the panel driver 130 which is connected to the pad portion PP of the upper substrate 112 overlapped with the boundary region 102c. At this time, each pixel of the main display region 102a and the sub display region 102b forms electric field in the liquid crystal layer in accordance with the analog data signal supplied from the panel driver 130 to control light transmittance irradiated from the back light unit 140, thereby displaying a predetermined image in each of the main display region 102a and the sub display region 102b.

Referring to FIGS. 2 and 3 again, the back light unit 140 is received in the panel support member 120 and irradiates light to each of the main display region 102a and the sub display region 102b of the display panel 110. To this end, the back light unit 140 includes first and second back light units 140a and 140b.

The first back light unit 140a is received in the panel support member 120 102a to overlap the main display region 102a so that it irradiates light to the main display region. To this end, the first back light unit 140a includes a first reflecting sheet 142a, a first light guide plate 144a, a first light source 146a, and a first optical sheet member 148a.

The first reflecting sheet 142a is arranged on the back surface of the first light guide plate 144a and reflects the light from the first light guide plate 144a to the main display region 102a of the display panel 110.

The first light guide plate 144a is formed in a flat (or wedge) type to have a light-incident surface provided at at least one side and forwards the light incident from the first light source 146a through the light-incident surface to the main display region 102a. The other sides, i.e., non-light-incident surfaces, of the first light guide plate 144a except for the light-incident surface where the light is irradiated from the first light source 146a may be surrounded by the first reflecting sheet 142a. To this end, the first reflecting sheet 142a is bent by half cutting to surround the non-light-incident surface of the first light guide plate 144a.

The first light source 146a includes a plurality of light emitting diodes and is arranged to face the light-incident surface of the first light guide plate 144a. At this time, it is preferable that the first light source 146a is arranged at the panel support member 120 to adjoin the boundary region 102c. The upper portion of the light-incident surface of the first light guide plate 144a and the first light source 146a may be surrounded by a light source housing (not shown).

The first optical sheet member 148a is arranged on the first light guide plate 144a and improves luminance characteristics of light forwarding from the first light guide plate 144a to the main display region 102a. To this end, the first optical sheet member 148a may include at least one diffusion sheet and prism sheet of a lower diffusion sheet, a lower prism sheet, an upper prism sheet, and an upper diffusion sheet.

The second back light unit 140b is received in the panel support member 120 to overlap the sub display region 102b so that it irradiates light to the sub display region 102b. To this end, the second back light unit 140b includes a second reflecting sheet 142b, a second light guide plate 144b, a second light source 146b, and a second optical sheet member 148b. Since the second reflecting sheet 142b, the second light guide plate 144b, the second light source 146b, and the second optical sheet member 148b are the same as those of the first back light unit 140a except that they are formed to be received in the panel support member 120 to overlap the sub display region 102a, their repeated description will be omitted.

The panel support member 120 includes first and second guide frames 122a and 122b and a cover member 124.

The first guide frame 122a is coupled to the back surface of the display panel 110 corresponding to the main display region 102a through a first coupling member 121a and received in the cover member 124. To this end, the first guide frame 122a includes a first panel coupling portion 122a1 and a first guide sidewall 122a2.

The first panel coupling portion 122a1 is coupled to a corner portion of the back surface of the first lower substrate 114a through the first coupling member 121a. At this time, although the first panel coupling portion 122a1 is coupled to the corner portion of the back surface of the first lower substrate 114a by the first coupling member 121a, it may be coupled to the corner portion of the first lower polarizing film 118a attached to the entire back surface of the first lower substrate 114a.

The first coupling member 121a may be made of a double-sided tape or adhesive.

The first guide sidewall 122a2 is vertically bent from the first panel coupling portion 122a1 and supported or coupled to the cover member 124.

The second guide frame 122b is coupled to the back surface of the display panel 110 corresponding to the sub display region 102b through a second coupling member 121b and received in the cover member 124. To this end, the second guide frame 122b includes a second panel coupling portion 122b1 and a second guide sidewall 122b2.

The second panel coupling portion 122b1 is coupled to a corner portion of the back surface of the second lower substrate 114b through the second coupling member 121b. At this time, although the second panel coupling member 122b1 is coupled to the corner portion of the back surface of the second lower substrate 114b by the second coupling member 121b, it may be coupled to the corner portion of the second lower polarizing film 118b attached to the entire back surface of the second lower substrate 114b.

The second coupling member 121b may be made of a double-sided tape or adhesive.

The second guide sidewall 122b2 is vertically bent from the second panel coupling portion 122b1 and supported or coupled to the cover member 124.

The cover member 124 supports the guide sidewall 122a and 122b and also supports the display panel 110 to externally expose the entire upper surface and side of the display panel 110. To this end, the cover member 124 includes first and second support cases 124a1 and 124a2 and a set cover 124b.

The first support case 124a1 is formed to have a receiving space provided by a first support plate 124a11 and a first support sidewall 124a12 vertically bent from the first support plate 124a11. The first support case 124a1 receives the first back light unit 140a through the receiving space and supports the first guide frame 122a. At this time, the first support case 124a1 and the first guide frame 122a may be coupled to each other by a securing member (not shown) such as a hook or screw.

The second support case 124a2 is formed to have a receiving space provided by a second support plate 124a21 and a second support sidewall 124a22 vertically bent from the second support plate 124a21. The second support case 124a2 receives the second back light unit 140b through the receiving space and supports the second guide frame 122b. At this time, the second support case 124a2 and the second guide frame 122b may be coupled to each other by a securing member (not shown) such as a hook or screw.

The set cover 124b is formed to have a receiving space provided by a set plate 124b1 and a set sidewall 124b2 vertically bent from the set plate 124b1. The set cover 124b receives the first and second support cases 124a1 and 124a2 and the first and second guide frames 122a and 122b through the receiving space. Also, the set cover 124b surrounds the sides of the first and second guide frames 122a and 122b by supporting the corner portion on the back surface of the display panel 110 through the set sidewall 124b2 and externally exposes the entire upper surface and the side of the display panel 110. At this time, the set sidewall 124b2 supports the corner portion of the back surface of the lower substrates 114a and 114b overlapped with the periphery portion 104.

Meanwhile, the set sidewall 124b2 of the set cover 124b may support the corner portion of the back surface of the upper substrate overlapped with the periphery portion 104. To this end, the upper substrate 112 is extended to overlap each upper surface of the set sidewall 124b2.

The aforementioned first and second support cases 124a1 and 124a2 may be omitted in accordance with slimness of the display apparatus 100. In this case, the set cover 124b may be coupled to the first and second guide frames 122a and 122b by a securing member (not shown) such as hook or screw.

Meanwhile, as the aforementioned panel support member 120 is coupled to the display panel 110, the upper surface and side of the display panel 110 are externally exposed, whereby the side of the display panel 110 may be damaged. To prevent the display panel 110 from being damaged, the display apparatus 100 according to the first embodiment of the present invention may further include a side protection member 150.

The side protection member 150 is formed at each side of the display panel 110 externally exposed. Namely, the side protection member 150 is formed to cover the side of each of the upper substrate 112, the lower substrates 114a and 114b and the upper polarizing member 116.

Although the side protection member 150 may be made of a silicon based sealing material or UV hardening based sealing material (or resin), it is preferable that the side protection member 150 is made of the UV hardening based sealing material considering process tack time. Also, although the side protection member 150 may be colorless (or transparent) or colored (for example, blue red, bluish green, or black), it is not limited to such examples and may be selected in accordance with a design aspect of the display apparatus. Preferably, the side protection member 150 is made of a colored resin or light shielding resin to prevent side light leakage of the display panel 110, which is caused by total internal reflection occurring in the lower substrates 114a and 114b, from occurring.

As described above, the display apparatus 100 according to the first embodiment of the present invention has a thin thickness and an entire flat surface of the display panel 110 by externally exposing the entire upper surface of the display panel 110 and supporting the back surface of the display panel 110 through the panel support member 120, thereby obtaining improved sense of beauty.

Also, in the display apparatus 100 according to the first embodiment of the present invention, the display panel 110 is divided into the main display region 102a and the sub display region 102b and, in addition to moving image or still image displayed in the main display region 102a, additional information such as manufacturer logo of the display apparatus, caption information of moving image, volume information, channel information, and time information may be provided to the user through the sub display region 102b.

Also, the display apparatus 100 according to the first embodiment of the present invention may definitely identify the main image displayed in the main display region 102a from the sub image displayed in the sub display region 102b through the boundary region 102c.

Figure 8:
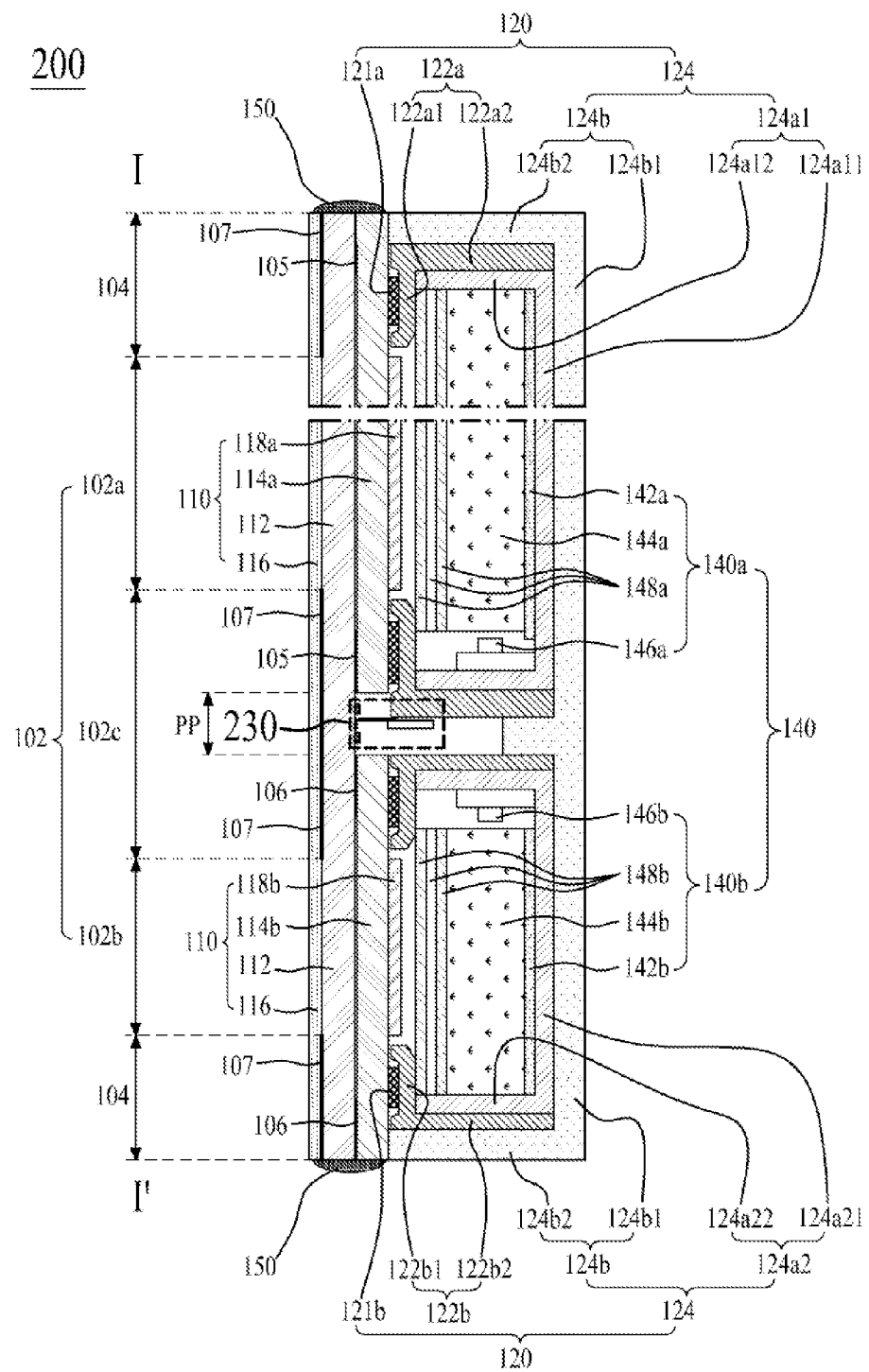
FIG. 8 is a cross-sectional view taken along line I-I' of FIG. 2, illustrating a display apparatus according to the second embodiment of the present invention.

FIG. 8 is a cross-sectional view taken along line I-I' of FIG. 2, illustrating a display apparatus according to the second embodiment of the present invention.

Referring to FIG. 8 in conjunction with FIG. 2, the display apparatus 200 according to the second embodiment of the present invention includes a display panel 110, which includes a display portion 102 having a main display region 102a and a sub display region 102b formed by interposing a boundary region 102c therebetween, and a periphery portion 104 surrounding the display portion 102, a panel driver 230 connected to the display panel 110 overlapped with the boundary region 102c, and a panel support member 120 supporting the display panel 110 to externally expose an entire upper surface of the display panel 110. Since the display apparatus 200 according to the second embodiment of the present invention as above includes the same elements as those of the display apparatus 100 shown in FIG. 3 except for the panel driver 230, the repeated description of the same elements will be omitted.

Figure 9:
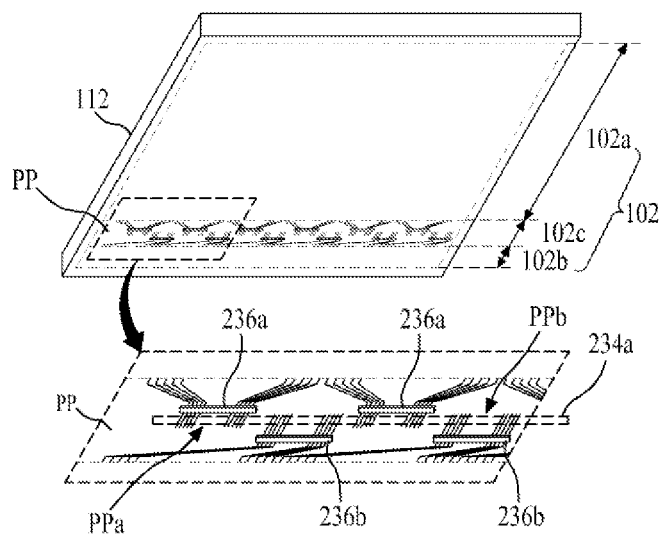
FIGS. 9 and 10 are diagrams illustrating a pad portion and a panel driver shown in FIG. 8.
Figure 10:
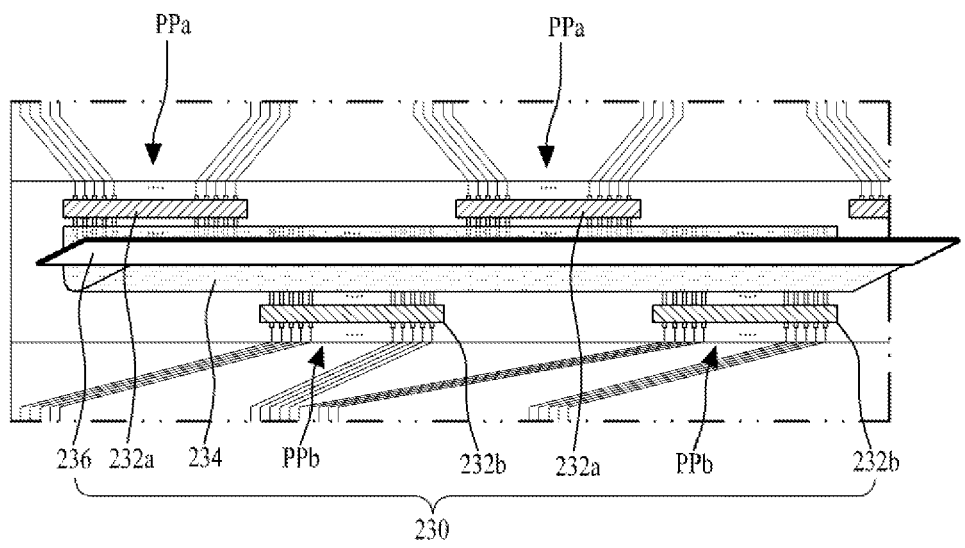

The panel driver 230, as shown in FIGS. 9 and 10, includes a plurality of first and second data driving integrated circuits 232a and 232b packaged in the pad portion PP of the upper substrate 112, a flexible circuit film 234, and a printed circuit board 236.

Each of the plurality of first data driving integrated circuits 232a may directly be packaged in a chip package region provided in the first connection portion PPa of the aforementioned pad portion PP in accordance with a chip on glass (COG) mode. Each of the plurality of first data driving integrated circuits 232a converts a digital data signal provided from a timing controller (not shown) packaged in the printed circuit board 236 through the flexible circuit film 234 into an analog data signal and supplies the signal to the data line of the main display region 102a.

Each of the plurality of second data driving integrated circuits 232b may directly be packaged in a chip package region provided in the second connection portion PPb of the aforementioned pad portion PP in accordance with a chip on glass (COG) mode. Each of the plurality of second data driving integrated circuits 232b converts a digital data signal provided from a timing controller (not shown) packaged in the printed circuit board 236 through the flexible circuit film 234 into an analog data signal and supplies the signal to the data line of the sub display region 102b.

The flexible circuit film 234 is attached to a film attachment region 234a provided in the pad portion PP in accordance with the aforementioned TAB process and electrically connected to each pad of the first and second connection portions PPa and PPb. At this time, one side of the flexible circuit film 234 attached to the pad portion PP may include an extension portion extended at a predetermined length and attached to each of the first and second connection portions PPa and PPb. The other side of the flexible circuit film 234 which is not attached to the pad portion PP may be attached to the printed circuit board 236, or may be connected to a connector (not shown) provided in the printed circuit board 236.

The printed circuit board 236 is electrically connected to the flexible circuit film 234 and provides various signals for displaying image in the main display region 102a and the sub display region 102b of the display panel 110. The printed circuit board 236 is arranged in a space between the first and second lower substrates 114a and 114b to overlap the boundary region 102c.

A timing controller (not shown) for driving each of the main display region 102a and the sub display region 102b, various power circuits (not shown), and a memory device (not shown) are packaged in the printed circuit board 236. At this time, the timing controller controls driving of a gate driving circuit formed in the upper substrate 112 through a control line (not shown) formed in the upper substrate 112 and the flexible circuit film 234.

Figure 11:
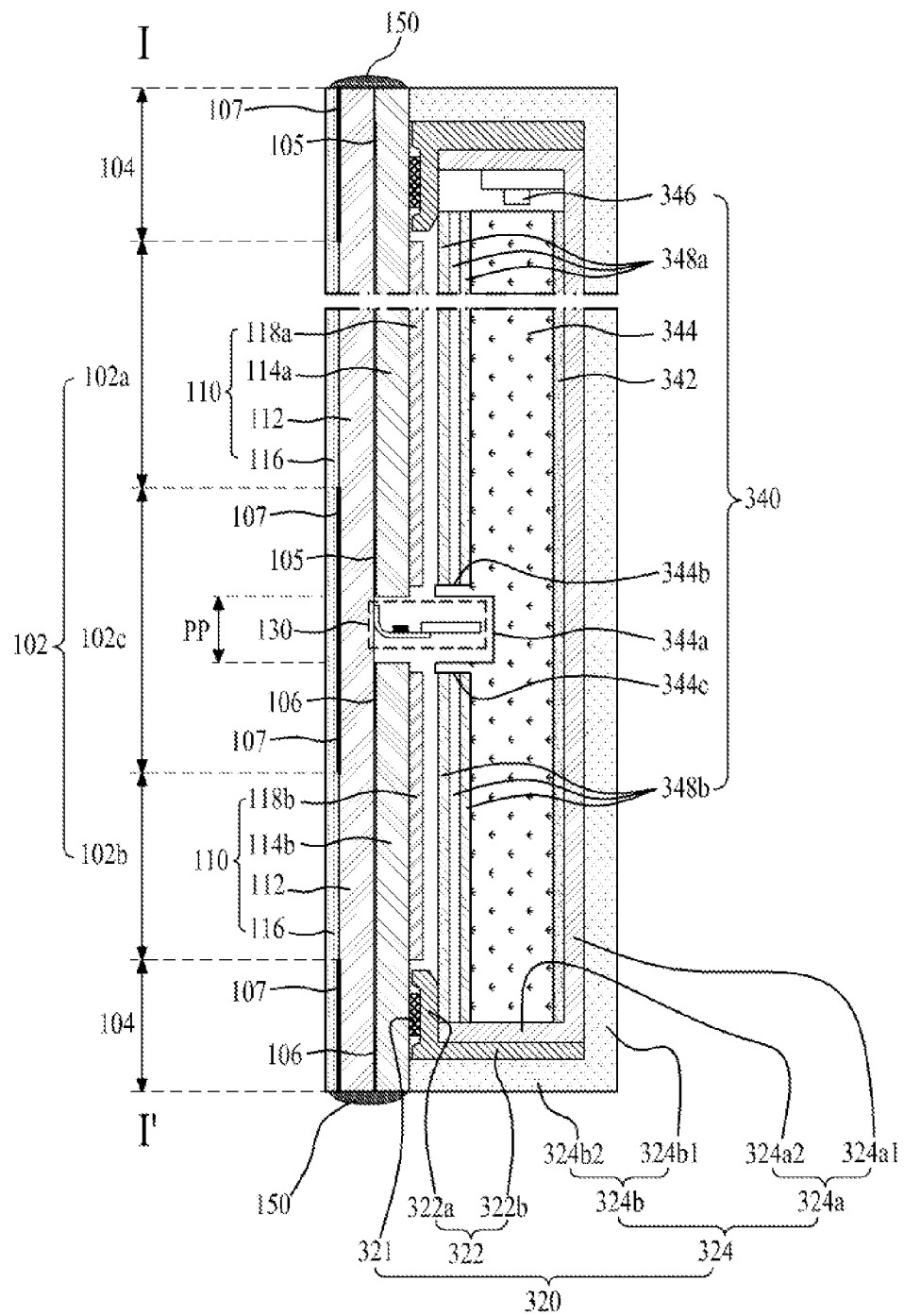
FIG. 11 is a cross-sectional view taken along line I-I' of FIG. 2, illustrating a display apparatus according to the third embodiment of the present invention.

FIG. 11 is a cross-sectional view taken along line I-I' of FIG. 2, illustrating a display apparatus according to the third embodiment of the present invention.

Referring to FIG. 11 in conjunction with FIG. 2, the display apparatus 300 according to the third embodiment of the present invention includes a display panel 110, which includes a display portion 102 having a main display region 102a and a sub display region 102b formed by interposing a boundary region 102c therebetween, and a periphery portion 104 surrounding the display portion 102, a back light unit 340 irradiating light to the display panel 110, and a panel support member 320 supporting the display panel 110 to externally expose an entire upper surface of the display panel 110. Since the display apparatus 300 according to the third embodiment of the present invention as above includes the same elements as those of the display apparatuses 100 and 200 shown in FIG. 3 and FIG. 8 except for the back light unit 340 and the panel support member 320, the repeated description of the same elements will be omitted.

The back light unit 340 includes a reflecting sheet 342, a light guide plate 344, a light source 346, a first optical sheet member 348a, and a second optical sheet member 348b.

The reflecting sheet 344 is arranged on the back surface of the light guide plate 344 to overlap the display portion 102 and reflects the light from the light guide plate 344 to the display panel 110.

The light guide plate 344 is formed in a flat (or wedge) type to have a light-incident surface provided at at least one side and forwards the light incident from the light source 346 through the light-incident surface to the main display region 102a and the sub display region 102b. The other sides, i.e., non-light-incident surfaces, of the light guide plate 344 except for the light-incident surface where the light is irradiated from the light source 346 may be surrounded by the reflecting sheet 342. To this end, the reflecting sheet 342 is bent by half cutting to surround the non-light-incident surface of the light guide plate 344.

The light guide plate 344 includes a receiving groove 344a formed between the main display region 102a and the sub display region 102b at a predetermined depth to overlap the boundary region 102. The receiving groove 344a receives the panel driver 130. And, the light guide plate 344 includes first and second sheet fixing portions 344b and 344c extended at a predetermined height to face each other by interposing the receiving groove 344a therebetween.

Figure 12:
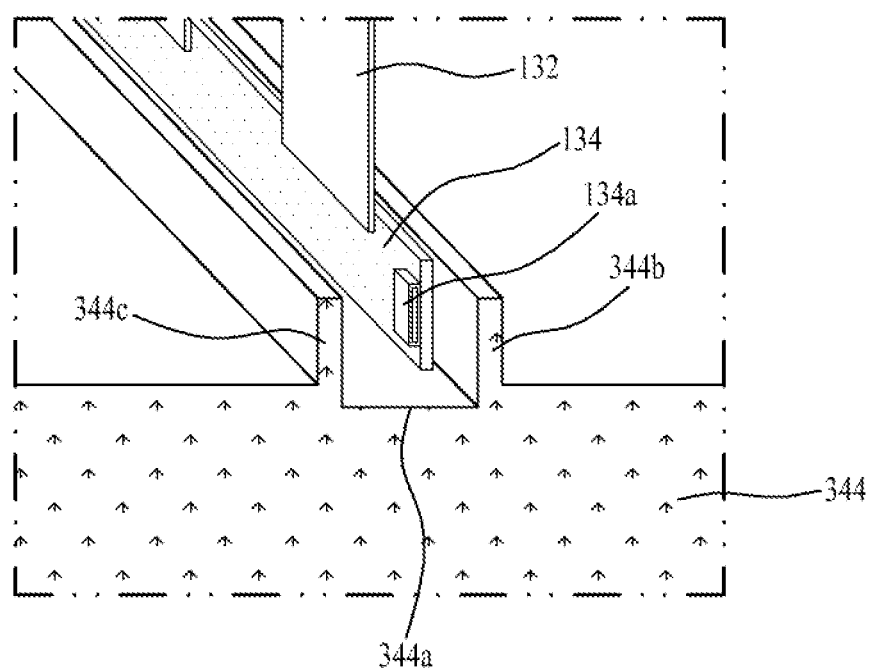
FIG. 12 is a diagram illustrating a printed circuit board arranged in a receiving groove of a light guide plate shown in FIG. 11.

As shown in FIG. 12, the printed circuit board 134 of the aforementioned panel driver 130 is vertically or horizontally arranged in a panel driver receiving space provided by the first and second sheet fixing portions 344b and 344c and the receiving groove 344a. A user connector 134a is provided at a corner portion of one side of the printed circuit board 134. As a result, the user connector 134a of the printed circuit board 134 is exposed to the end of one side of the receiving groove 344a and connected to a signal cable (not shown) of a driving system (not shown) of the display apparatus 300.

The panel support member 320 includes a guide frame 322 and a cover member 324.

The guide frame 322 is coupled to the corner portion of the back surface of the display panel 110 through a coupling member 321 and received in the cover member 324. To this end, the guide frame 322 includes a panel coupling portion 322a and a guide sidewall 322b.

The panel coupling portion 322a is coupled to a corner portion of the back surface of the first and second lower substrates 114a and 114b overlapped with the periphery portion 104, through the coupling member 321. At this time, although the panel coupling portion 322a is coupled to the corner portion of the back surface of the lower substrates 114a and 114b overlapped with the periphery portion 104, by the coupling member 321, it may be coupled to the corner portion of the first and second lower polarizing films 118a and 118b attached to the entire back surface of the first and second lower substrates 114a and 114b and overlapped with the periphery portion 104.

The coupling member 321 may be made of a double-sided tape or adhesive.

The guide sidewall 322b is vertically bent from the panel coupling portion 322a and supported or coupled to the cover member 324.

The cover member 324 supports the guide sidewall 322b of the guide frame 322 and also supports the display panel 110 to externally expose the entire upper surface and side of the display panel 110. To this end, the cover member 324 includes a support case 324a and a set cover 324b.

The support case 324a is formed to have a receiving space provided by a support plate 324a1 and a support sidewall 324a2 vertically bent from the support plate 324a1. The support case 324a receives the back light unit 340 through the receiving space and supports the guide frame 322. At this time, the support case 324a and the guide frame 322 may be coupled to each other by a securing member (not shown) such as a hook or screw.

The set cover 324b is formed to have a receiving space provided by a set plate 324b1 and a set sidewall 324b2 vertically bent from the set plate 324b1. The set cover 324b receives the support case 324a and the guide frame 322 through the receiving space. Also, the set cover 324b surrounds the side of the guide frame 322 by supporting the corner portion on the back surface of the display panel 110 through the set sidewall 324b2 and externally exposes the entire upper surface and the side of the display panel 110. At this time, the set sidewall 324b2 supports the corner portion of the back surface of the lower substrates 114a and 114b overlapped with the periphery portion 104.

Meanwhile, the set sidewall 324b2 of the set cover 324b may support the corner portion of the back surface of the upper substrate 112 overlapped with the periphery portion 104. To this end, the upper substrate 112 is extended to overlap each upper surface of the set sidewall 324b2.

The aforementioned support case 324a may be omitted in accordance with slimness of the display apparatus. In this case, the set cover 324b may be coupled to the guide frame 322 by a securing member (not shown) such as hook or screw.

Figure 13:
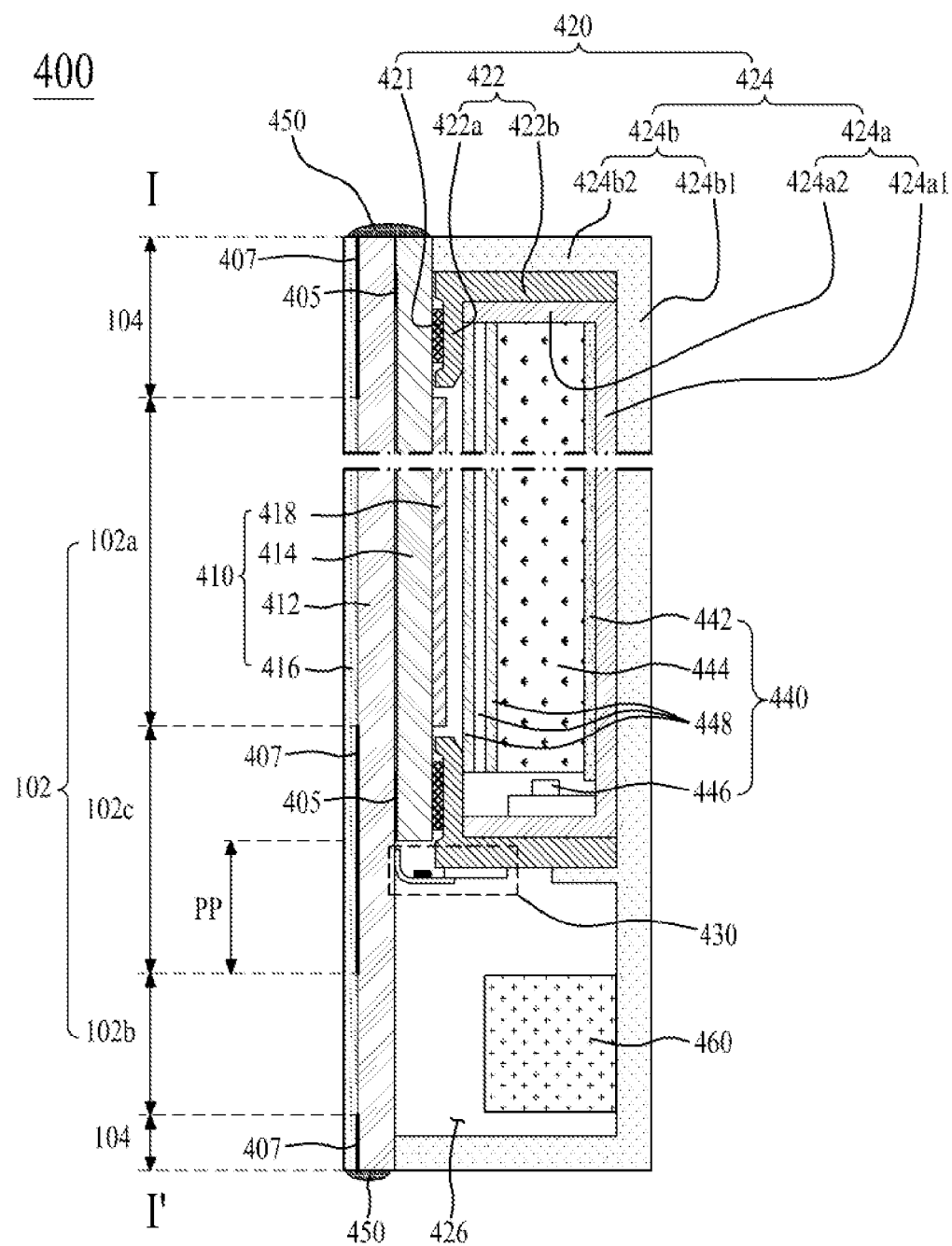
FIG. 13 is a cross-sectional view taken along line I-I' of FIG. 2, illustrating a display apparatus according to the fourth embodiment of the present invention.

FIG. 13 is a cross-sectional view taken along line I-I' of FIG. 2, illustrating a display apparatus according to the fourth embodiment of the present invention.

Referring to FIG. 13 in conjunction with FIG. 2, the display apparatus 400 according to the fourth embodiment of the present invention includes a display panel 410, which includes a main display region 102a and a sub display region 102b formed by interposing a boundary region 102c therebetween, a panel support member 420 supporting the display panel 410 to externally expose an entire upper surface of the display panel 410, a back light unit 440 received in the panel support member 420, irradiating light to the display panel 410, and a sub display means 460 received in the panel support member 420, displaying predetermined additional information in the sub display region 102c.

The display panel 410 includes a display portion 102 having a main display region 102a and a sub display region 102b formed by interposing a boundary region 102c therebetween, and a periphery portion 104 supporting the display portion 102. To this end, the display panel 410 includes an upper substrate 412, a lower substrate 414, an upper polarizing member 416, and a lower polarizing member 418.

The upper substrate 412 is a thin film transistor array substrate and has the same structure as that of the upper substrate 112 shown in FIG. 3. Accordingly, the repeated description of the upper substrate 412 will be omitted.

The lower substrate 414 is formed to have an area relatively smaller than that of the upper substrate 412, and then is bonded to the back surface of the upper substrate 412 corresponding to the main display region 102a by interposing a liquid crystal layer (not shown) therebetween. In other words, the lower substrate 414 is bonded to the upper substrate 412 by the sealing member 405 except for the sub display region 102c. The lower substrate 414 is a color filter array substrate and has the same structure as that of the first lower substrate 114a shown in FIG. 3. Accordingly, the repeated description of the lower substrate 414 will be omitted.

Since the upper polarizing member 416 is formed in the same manner as the upper polarizing member 116 shown in FIG. 4a or 4b, its repeated description will be omitted.

The lower polarizing member 418 is a polarizing film attached to the back surface of the lower substrate 414 and polarizes the light irradiated from the back light unit 440 to the lower substrate 414.

The main display region 102a of the display panel 410 is defined by a region where the lower substrate 414 is bonded to the upper substrate 412. On the other hand, the sub display region 102b of the display panel 410 is defined by an extension region of the upper substrate 412 extended to have an area greater than that of the lower substrate 414.

The boundary region 102c of the display panel 410 includes a region overlapped with the panel driver 430 connected to the pad portion PP formed in the upper substrate 412. A boundary coating layer 407a on the upper substrate 412 or the upper polarizing member 416 can be formed in the boundary region 102c, wherein the boundary coating layer 407a may have a black color or a predetermined color.

Figure 14:
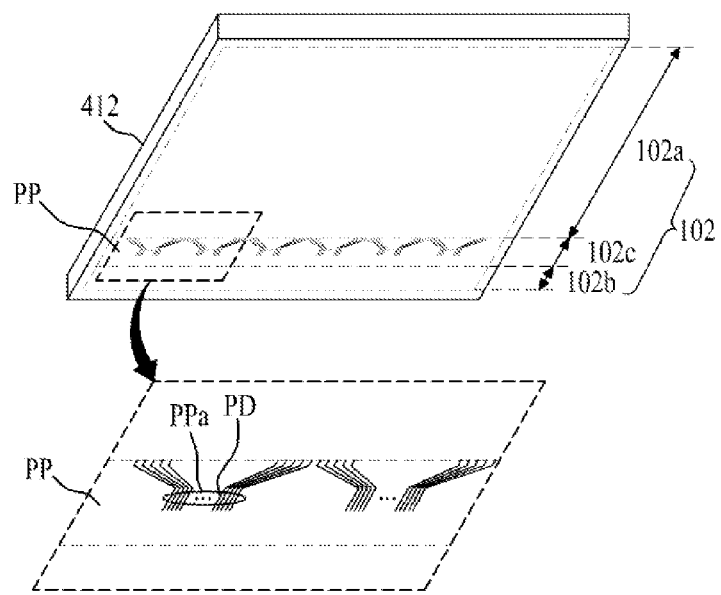
FIG. 14 is a diagram illustrating a pad portion shown in FIG. 13.

The pad portion PP, as shown in FIG. 14, includes a plurality of connection portions PPa formed to overlap the boundary region 102c. Each of the plurality of the connection portions PPa includes a plurality of pads PD connected to the data line of the main display region 102a. Each of the plurality of pads PD is connected to the data line of the main display region 102a through a link line.

The pad portion PP as above is connected to the panel driver 430 and transfers a signal provided from the panel driver 430 to pixels of the main display region 102a.

Figure 15:
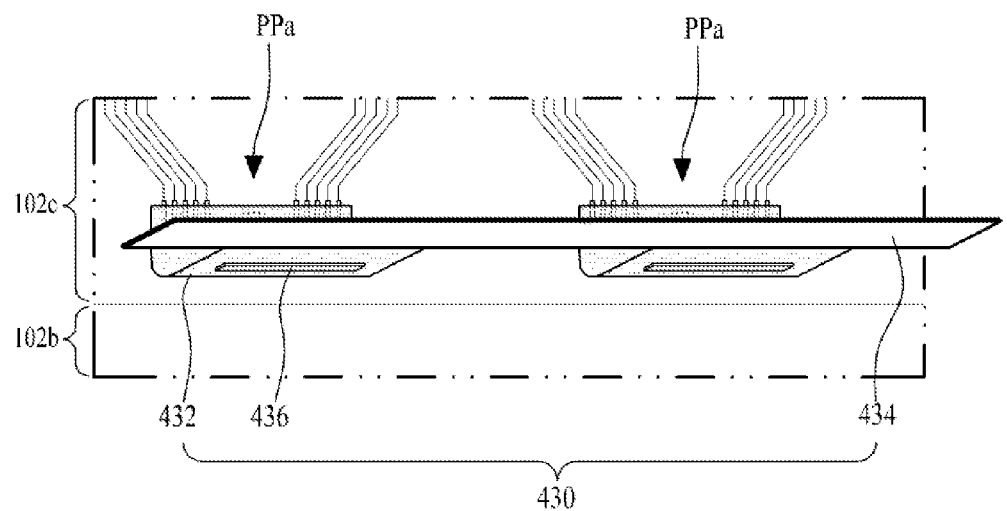
FIG. 15 is a diagram illustrating a panel driver shown in FIG. 13.

The panel driver 430 is connected to the pad portion PP and individually drives the pixels of the main display region 102a. To this end, the panel driver 430, as shown in FIG. 15, includes a plurality of circuit films 432 connected to the pad portion PP, and a printed circuit board 434 connected to the plurality of circuit films 432.

Each of the plurality of circuit films 432 is electrically connected to each connection portion PPa of the pad portion PP by the TAB process and is also electrically connected to the printed circuit board 434. A data driving integrated circuit 436 is packaged in each of the plurality of circuit films 432.

The data driving integrated circuit 436 converts a digital data signal provided from a timing controller (not shown) packaged in the printed circuit board 434 through the circuit film 432 into an analog data signal and supplies the converted signal to the data line of the main display region 102a.

The printed circuit board 434 is electrically connected to the plurality of circuit films 432 and provides various signals for displaying image in the main display region 102a of the display panel 410. The printed circuit board 434 is arranged to overlap the boundary region 102c.

A timing controller (not shown) for driving the main display region 102a or respectively driving the main display region 102a and the sub display region 102b, various power circuits (not shown), and a memory device (not shown) are packaged in the printed circuit board 434. At this time, the timing controller controls driving of a gate driving circuit formed in the upper substrate 412 through a control line (not shown) formed in the upper substrate 112 and the circuit film 432.

Meanwhile, the data driving integrated circuit 436 of the aforementioned panel driver 430 may directly be packaged in the pad portion PP of the upper substrate 412 by the COG mode in the same manner as the display apparatus 200 shown in FIG. 8. In this case, the data driving integrated circuit 436 packaged in the upper substrate 412 is connected to the printed circuit board 434 through a flexible circuit film.

Referring to FIG. 13 again, the periphery portion 104 of the display panel is defined by the region overlapped with the corner portion of the upper substrate 412. An edge coating layer 407b on the upper substrate 412 or the upper polarizing member 416 can be formed in the periphery portion 104, wherein the edge coating layer 407b may have a black color or a predetermined color.

A side protection member 450 is formed at each side of the display panel 410 constructed as above. The side protection member 450 is formed at each side of the display panel 410 externally exposed, to protect the side of the display panel 410 and prevent peeling of the upper polarizing member 416 from being caused. This side protection member 450 may be formed of the same material as that of the side protection member 150 shown in FIG. 3.

The back light unit 440 is received in the panel support member 420 to overlap the main display region 102a of the display panel 410 and irradiates light to the main display region 102a of the display panel 110. To this end, the back light unit 440 includes a reflecting sheet 442, a light guide plate 444, a light source 446, and an optical sheet member 448. Since the back light unit 440 is substantially the same as the first back light unit 140a shown in FIG. 3a, its repeated description will be omitted.

The panel support member 420 includes a guide frame 422 and a cover member 424.

The guide frame 422 is coupled to the back surface of the display panel 410 corresponding to the main display region 102a through a coupling member 421. To this end, the guide frame 422 includes a panel coupling portion 422a and a guide sidewall 422b.

The panel coupling portion 422a is coupled to the corner portion on the back surface of the lower substrate 414 through the coupling member 421. At this time, although the panel coupling member 422a is coupled to the corner portion on the back surface of the lower substrate 414, it may be coupled to the corner portion of the lower polarizing film 418 attached to the entire back surface of the lower substrate 414.

The coupling member 421 may be made of a double-sided tape, light hardening adhesive, or thermal hardening adhesive.

The guide sidewall 422b is vertically bent from the panel coupling portion 422a and supported or coupled to the cover member 424.

The cover member 424 supports the guide sidewall 422b of the guide frame 422 and also supports the display panel 410 to externally expose the entire upper surface and side of the display panel 410. To this end, the cover member 424 includes a support case 424a and a set cover 424b.

The support case 424a is formed to have a receiving space provided by a support plate 424a1 and a support sidewall 424a2 vertically bent from the support plate 424a1. The support case 424a receives the back light unit 440 through the receiving space and supports the guide frame 422. At this time, the support case 424a and the guide frame 422 may be coupled to each other by a securing member (not shown) such as a hook or screw.

The set cover 424b is formed to have a receiving space provided by a set plate 424b1 and a set sidewall 424b2 vertically bent from the set plate 424b1. The set cover 424b receives the support case 424a and the guide frame 422 through the receiving space. Also, the set cover 424b surrounds the side of the guide frame 422 by supporting the corner portion on the back surface of the display panel 410 through the set sidewall 424b2 and externally exposes the entire upper surface and the side of the display panel 410. At this time, the set sidewall 424b2 adjacent to the main display region 102a supports the corner portion of the back surface of the lower substrate 414. On the other hand, the set sidewall 424b2 adjacent to the sub display region 102b supports the corner portion on the back surface of the upper substrate 412 and thus is spaced apart from the guide sidewall 422b by interposing a dummy receiving space 426 corresponding to the sub display region 102b.

Meanwhile, the set sidewall 424b2 of the set cover 424b may support the corner portion on the back surface of the upper substrate 412 overlapped with the periphery portion 104. To this end, each of upper side, left side and right side of the upper substrate 412 is extended to overlap each upper surface of the set sidewall 424b2.

The sub display means 460 is arranged in a dummy receiving space 426 of the set cover 424b to overlap the sub display region 102b provided in the display panel 410. This sub display means 460 displays addition information of at least one of text, symbol, figure, and number in the sub display region 102b. At this time, the additional information may be manufacturer logo of the display apparatus, advertisements, caption information of moving image, volume information, channel information, and time information. The other region of the sub display region 102b except for the region where the additional information is displayed by the sub display means 460 may be covered with a light shielding layer (not shown) or a coating layer (not shown).

The sub display means 460 may include at least one of a light emitting diode display device, an organic light emitting display device and a vacuum fluorescent display device. Meanwhile, the sub display means 460 may be made of a sticker attached to the back surface of the upper substrate 412 overlapped with the sub display region 102b, for displaying the manufacturer logo only of the display apparatus in the sub display region 102b.

The aforementioned display apparatus 400 according to the fourth embodiment of the present invention may reduce driving load of the panel driver 430 as compared with the aforementioned display apparatuses 100, 200 and 300 according to the first to third embodiments of the present invention by displaying the additional information in the sub display region 102b through the sub display means 460.

Meanwhile, in the aforementioned display apparatus 400 according to the fourth embodiment of the present invention, various modifications may be made in the panel driver 430. Such a panel driver 430 may be arranged in the display panel 410.

Figure 16:
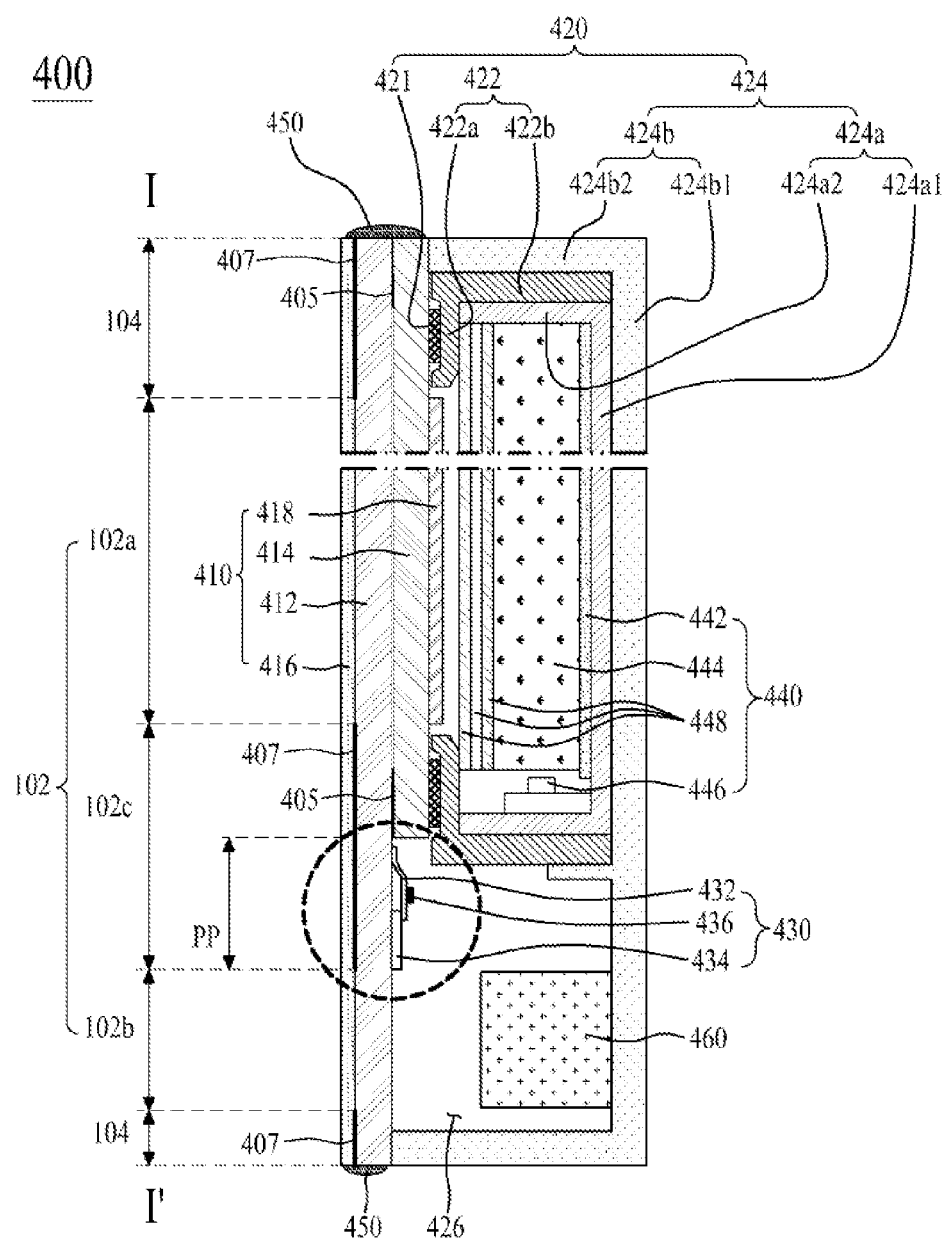
FIG. 16 is a diagram illustrating a first modification embodiment of a display apparatus according to the third embodiment of the present invention.

In case of the first modified embodiment, as shown in a dotted circle of FIG. 16, the printed circuit board 434 of the panel driver 430 is attached to the back surface of the upper substrate 412 overlapped with the boundary region 102c to reinforce rigidity of the upper substrate 412 extended to form the sub display region 102c.

Figure 17:
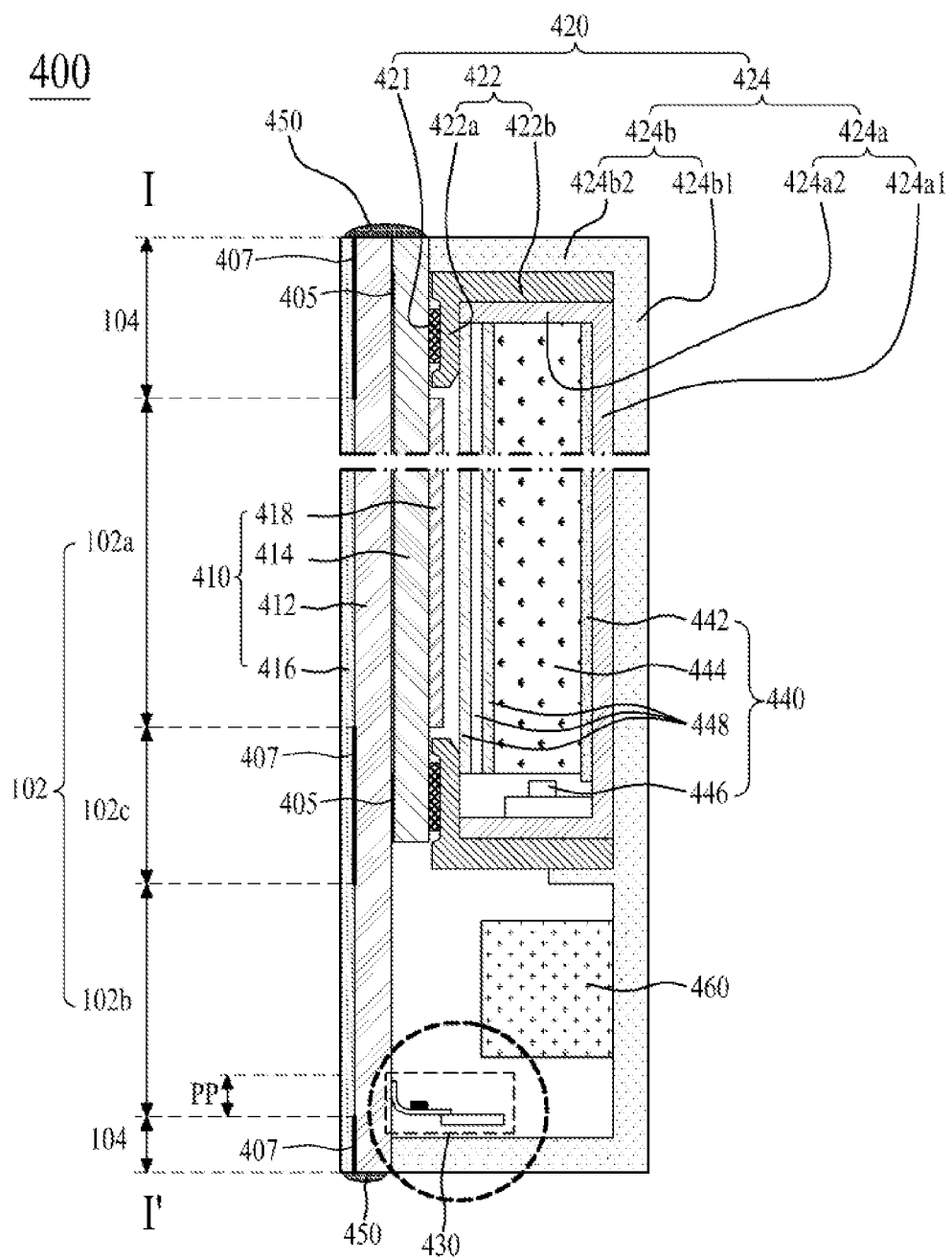
FIGS. 17 and 18 are diagrams illustrating a second modification embodiment of a display apparatus according to the third embodiment of the present invention.
Figure 18:
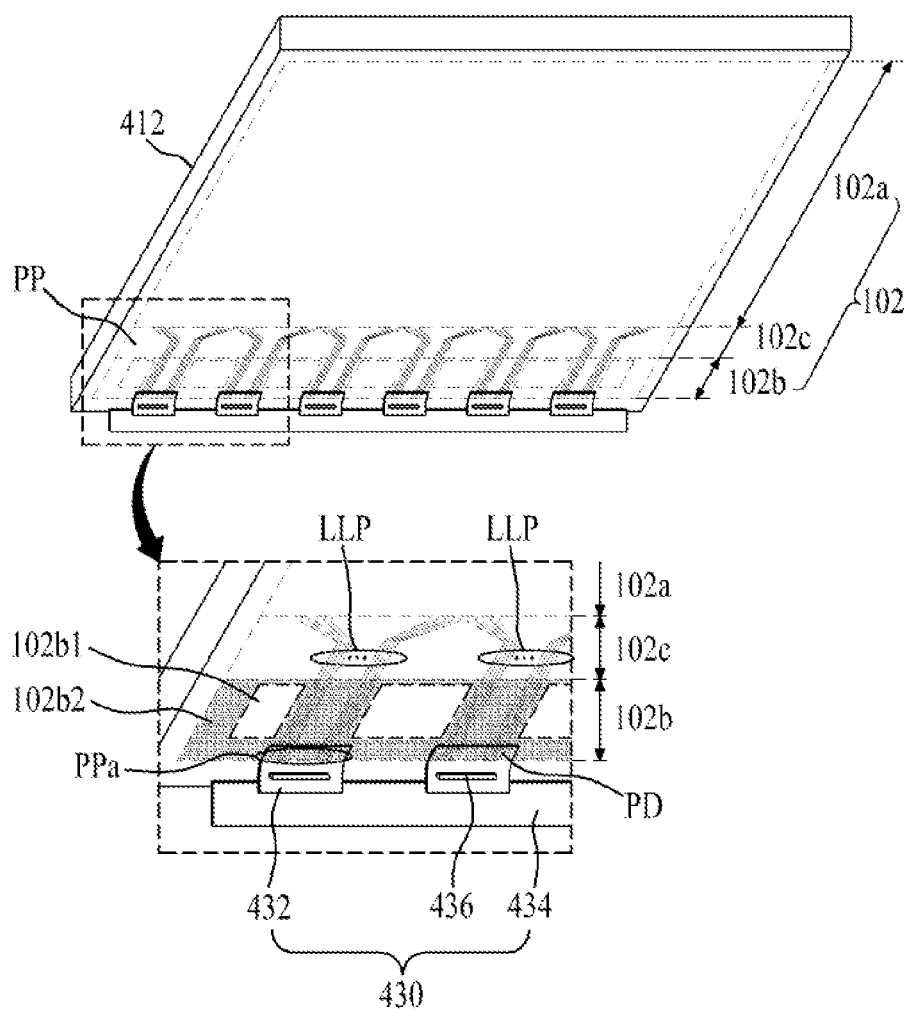

In case of the second modified embodiment, as shown in a dotted circle of FIG. 17, the panel driver 430 may be connected to the lower end of the upper substrate 412 overlapped with the lower side of the sub display region 102b. To this end, the pad portion PP formed in the upper substrate 412, as shown in FIG. 18, includes a plurality of connection portions PPa provided in a region away from the sub display means 460 at the lower end of the upper substrate 412, and the region overlapped with the lower side of the sub display region 102b or the periphery region 104. Each of the plurality of connection portions PPa includes a plurality of pads PD connected to the data line of the main display region 102a. Each of the plurality of pads PD is connected to the data line of the main display region 102a through a link line of each of a plurality of link line portions LLP to transfer the signal provided from the panel driver 430 to the pixels of the main display region 102a.

In case of the second modified embodiments, since the plurality of link line portions LLP are formed in the sub display region 102b, the aforementioned sub display means 460 displays the aforementioned additional information through a sub region 102b1 between the plurality of link line portions LLP. A region definition layer 102b2 for defining the sub region 102b1 may be formed in the sub display region 102b other than the sub region 102b1. At this time, the region definition layer 102b2 may be formed on the upper substrate 412 or the upper polarizing member 416 to have a black color or predetermined color.

In the second modified embodiment, the panel driver 430 is connected to the pad portion PP and drives the pixels of the main display region 102a. To this end, the panel driver 430 includes a plurality of circuit films 432 and a printed circuit board 434 connected to the plurality of circuit films 432. Since the panel driver 430 is the same as the aforementioned one except that the panel driver 430 is connected to the plurality of connection portions PPa provided in a region away from the sub display means 460 at the lower end of the upper substrate 412 and the region overlapped with the lower side of the sub display region 102b or the periphery region 104, its repeated description will be omitted.

Figure 19:
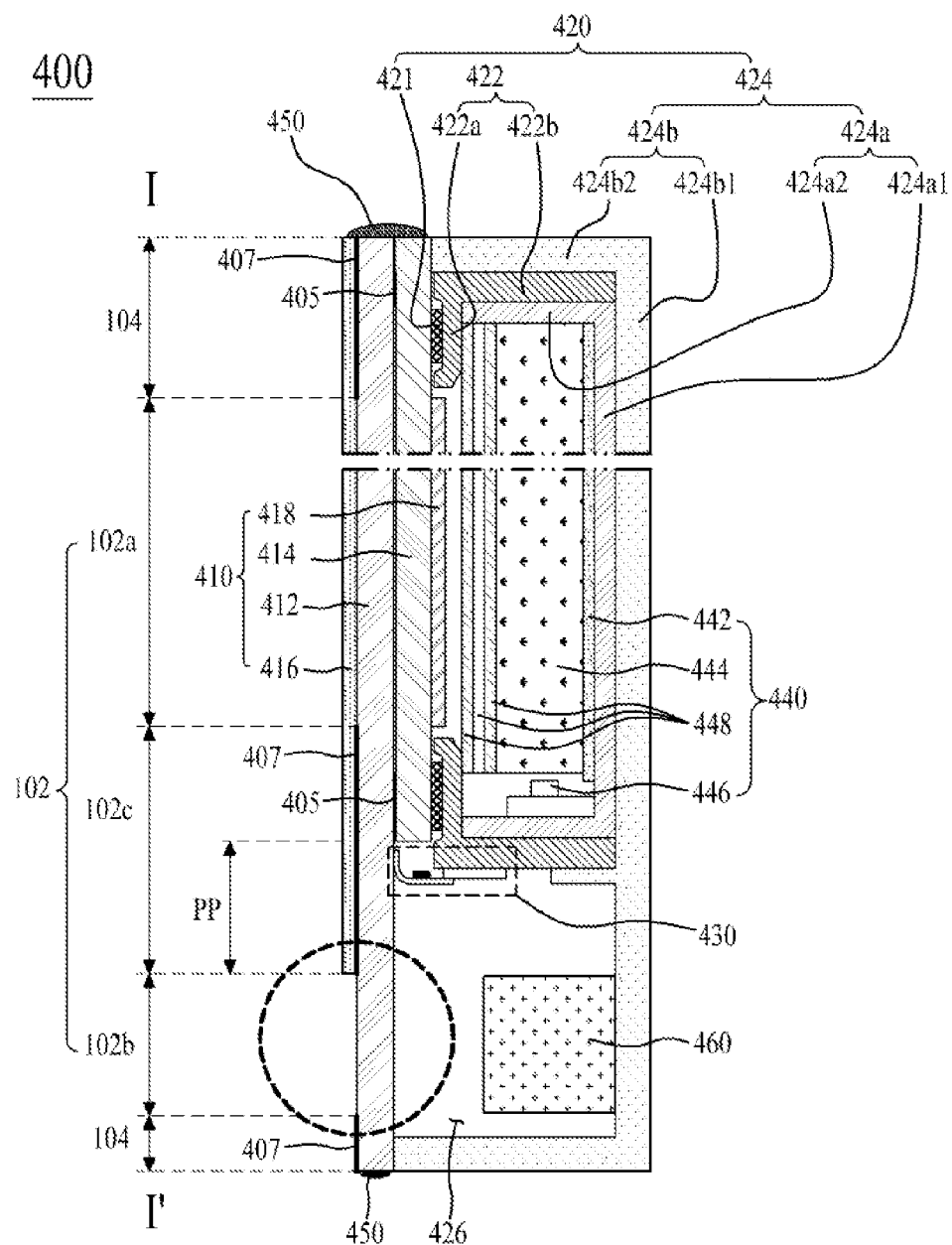
FIG. 19 is a diagram illustrating a third modification embodiment of a display apparatus according to the third embodiment of the present invention.

In case of the third modified embodiment, the upper polarizing member 416, as shown in a dotted circle of FIG. 19, may not be formed in the lower sides of the sub display region 102*b* and the periphery portion 104.

Figure 20:
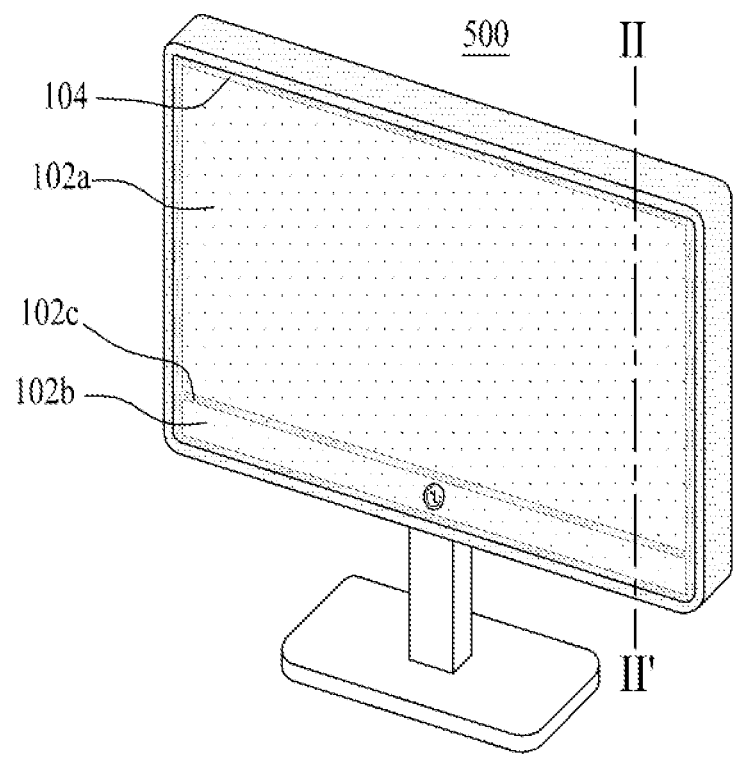
FIG. 20 is a diagram illustrating a display apparatus according to the fifth embodiment of the present invention.
Figure 21:
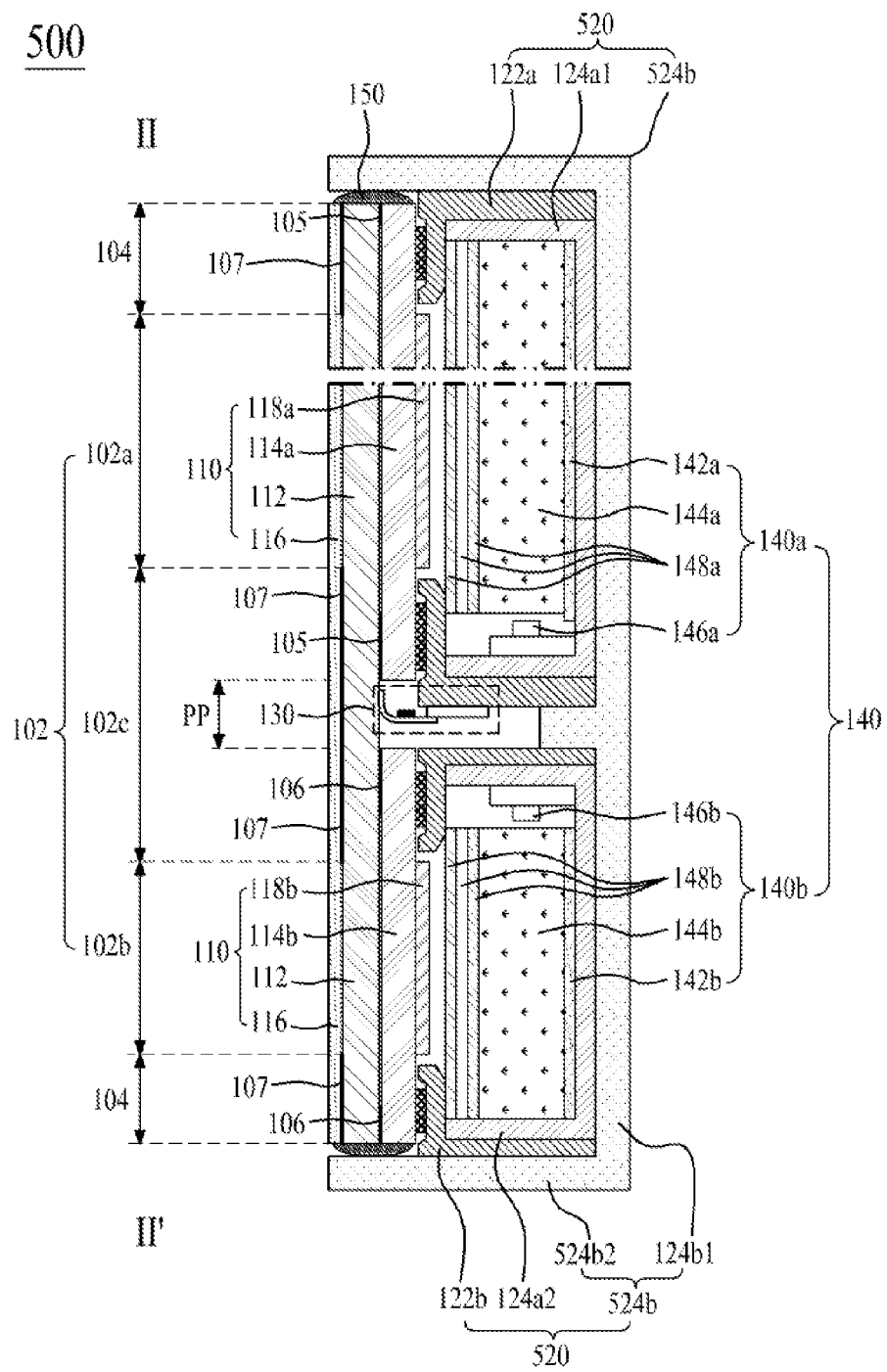
FIG. 21 is a cross-sectional view taken along line II-II' of FIG. 20, illustrating a display apparatus according to the fifth embodiment of the present invention.

FIG. 20 is a diagram illustrating a display apparatus according to the fifth embodiment of the present invention, and FIG. 21 is a cross-sectional view taken along line II-II' of FIG. 20, illustrating a display apparatus according to the fifth embodiment of the present invention.

Referring to FIGS. 20 and 21, the display apparatus 500 according to the fifth embodiment of the present invention includes a display panel 110, which includes a main display region 102*a* and a sub display region 102*b* formed by interposing a boundary region 102*c* therebetween, and a panel support member 520 supporting the display panel 110 to externally expose the entire upper surface of the display panel 110. Since the display apparatus 500 according to the fifth embodiment of the present invention as above includes the same elements as those of the display apparatuses 100 shown in FIG. 3 except for the panel support member 520, the repeated description of the same elements will be omitted.

The panel support member 520 includes first and second guide frames 122*a* and 122*b* and a cover member, wherein the cover member includes first and second support cases 124*a*1 and 124*a*2 and a set cover 524*b*. Since the panel support member 520 as above include the same elements as those of the display apparatus 100 shown in FIG. 3 except for the set cover 524*b*, the repeated description of the same elements will be omitted.

The set cover 524*b* is formed to have a receiving space provided by a set plate 124*b*1 and a set sidewall 524*b*2 vertically bent from the set plate 124*b*1. The set cover 524*b* receives the first and second support cases 124*a*1 and 124*a*2 and the first and second guide frame 122*a* and 122*b* through the receiving space.

Also, the set cover 524*b* externally exposes the entire upper surface of the display panel 110 by surrounding the side of the display panel 110 through the set sidewall 524*b*2. At this time, the upper surface of the set sidewall 524*b*2 is located on the same line as the upper surface of the display panel 110, i.e., the upper surface of the upper polarizing member 160 to form the periphery portion 104 of the display panel 110. As a result, the periphery portion 104 of the display panel 110 includes the upper surface of the set sidewall 524*b*2.

Meanwhile, the display apparatus 500 according to the fifth embodiment of the present invention may equally be applied to each of the aforementioned display apparatuses 100, 200, 300 and 400 according to the first to fourth embodiments of the present invention.

Although the liquid crystal display apparatus which is one of the display apparatuses has been described as above, the display apparatus according to the present invention is not limited to the aforementioned liquid crystal display apparatus, and may be various flat display apparatuses such as an organic light emitting display apparatus. For example, the display apparatus such as the organic light emitting display apparatus forms an organic light emitting device in an upper substrate or lower substrate in the same manner as the present invention, and displays image using light externally emitted through the upper substrate by driving the organic light emitting device through the panel driver connected to the upper substrate.

Meanwhile, the display apparatus according to the present invention may be used as that of a notebook computer, a tablet computer, or various portable information devices in addition to a display apparatus of a television (or monitor).

As described above, the display apparatus according to the present invention has the following advantages.

The display apparatus according to the present invention externally exposes the entire upper surface of the display panel, and has the think thickness by supporting the back surface of the display panel through the panel support member and also has the flat display panel, whereby improved esthetic sense is obtained.

In addition, the display apparatus according to the present invention may provide the user with various kinds of additional information through the sub display region as well as main image displayed in the main display region, and may definitely divide the main screen displayed in the main display region and the sub screen displayed in the sub display region through the boundary region.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display apparatus comprising:
   a display panel including an upper substrate having a signal line to which gate and data signals are supplied, and two lower substrates bonded to the upper substrate; and
   a panel support member supporting the display panel to externally expose an entire upper surface of the display panel,
   wherein the display panel includes:
   a display portion having a main display region, a sub display region having an area smaller than that of the main display region, and a boundary region dividing the main display region and the sub display region from each other; and
   a periphery portion surrounding the display portion,
   wherein the two substrates includes a first lower substrate bonded to the upper substrate to include the main display region and a second lower substrate bonded to the upper substrate to include the sub display region, and
   wherein the upper substrate includes a pad portion formed between the first and second lower substrates to overlap the boundary region.

2. The display apparatus of claim 1, further comprising a light shielding pattern formed to overlap the signal line.

3. The display apparatus of claim 1, wherein the display panel further includes an upper polarizing film and/or a stereoscopic optical member attached to an upper surface of the upper substrate.

4. The display apparatus of claim 1, wherein the pad portion includes:
   a plurality of first connection portions having a plurality of first pads connected to a signal line of the main display region; and
   a plurality of second connection portions having a plurality of second pads connected to a signal line of the sub display region.

5. The display apparatus of claim 4, wherein the first connection portions and the second connection portions are arranged alternately.

6. The display apparatus of claim 4, wherein the first pads and the second pads are arranged alternately.

7. The display apparatus of claim 4, further comprising a panel driver connected to the first and second connection portions to overlap the boundary region, respectively driving the main display region and the sub display region, wherein the panel driver includes:
- a plurality of first circuit films connected to each of the plurality of first connection portions;
- a plurality of first data driving integrated circuits packaged in each of the plurality of first circuit films;
- a plurality of second circuit films connected to each of the plurality of second connection portions;
- a plurality of second data driving integrated circuits packaged in each of the plurality of second circuit films; and
- a printed circuit board connected to the plurality of first and second circuit films.

8. The display apparatus of claim 4, further comprising a panel driver connected to the first and second connection portions to overlap the boundary region, respectively driving the main display region and the sub display region,
wherein the panel driver includes:
- a plurality of circuit films commonly connected to a pair of the first and second connection portions adjacent to each other;
- a plurality of first data driving integrated circuits packaged in each of the plurality of circuit films and connected to the first connection portion;
- a plurality of second data driving integrated circuits packaged in each of the plurality of circuit films and connected to the second connection portion; and
- a printed circuit board connected to the plurality of circuit films.

9. The display apparatus of claim 4, further comprising a panel driver connected to the first and second connection portions to overlap the boundary region, respectively driving the main display region and the sub display region,
wherein the panel driver includes:
- a plurality of first data driving integrated circuits packaged in the upper substrate to connect with each of the plurality of first connection portions;
- a plurality of second data driving integrated circuits packaged in the upper substrate to connect with each of the plurality of second connection portions;
- a flexible circuit film connected to each of the plurality of the first and second connection portions; and
- a printed circuit board connected to the flexible circuit film.

10. The display apparatus of claim 1, wherein the panel support member includes:
- a guide frame coupled to a corner portion on a back surface of the lower substrate; and
- a cover member supporting the guide frame and also supporting a corner portion on a back surface of the display panel.

11. The display apparatus of claim 1, wherein the panel support member includes:
- a guide frame coupled to a corner portion on a back surface of the lower substrate; and
- a cover member supporting the guide frames and also surrounding a side of the display panel.

12. The display apparatus of claim 1, further comprising a back light unit irradiating light to the display panel,
wherein the back light unit includes:
- a first back light unit portion arranged to overlap the main display region, irradiating light to the first lower substrate; and
- a second back light unit portion arranged to overlap the sub display region, irradiating light to the second lower substrate.

13. A display apparatus comprising:
- a display panel including an upper substrate having a signal line to which gate and data signals are supplied, and a lower substrate formed to have an area smaller than that of the upper substrate and bonded to the upper substrate;
- a panel support member supporting the display panel to externally expose an entire upper surface of the display panel; and
- a sub display means received in the panel support member to be arranged below the upper substrate overlapped with the sub display region,
wherein the display panel includes:
- a display portion having a main display region, a sub display region having an area smaller than that of the main display region, and a boundary region dividing the main display region and the sub display region from each other; and
- a periphery portion surrounding the display portion.

14. The display apparatus of claim 13, wherein the upper substrate includes a pad portion having a plurality of connection portions formed to overlap the boundary region and connected to the signal line of the main display region.

15. The display apparatus of claim 14, further comprising a panel driver connected to the plurality of connection portions to overlap the boundary region, driving the main display region,
wherein the panel driver includes:
- a plurality of circuit films connected to each of the plurality of connection portions;
- a plurality of data driving integrated circuits packaged in each of the plurality of circuit films; and
- a printed circuit board connected to the plurality of circuit films.

16. The display apparatus of claim 15, wherein the printed circuit board is attached to the back surface of the upper substrate overlapped with the boundary region.

17. The display apparatus of claim 14, further comprising a panel driver connected to the connection portions of the upper substrate, wherein the panel driver includes:
- a plurality of data driving integrated circuits packaged in the pad portion of the upper substrate;
- a flexible circuit film connected to each of the connection portions; and
- a printed circuit board connected to the flexible circuit film.

18. The display apparatus of claim 13, wherein the upper substrate includes a pad portion having a plurality of connection portions formed in a region away from the sub display means, and the region overlaps the sub display region or the periphery region and is connected to the signal line of the main display region through a link line.

19. The display apparatus of claim 18, further comprising a panel driver connected to the plurality of connection portions to overlap region away from the sub display means, driving the main display region,
wherein the panel driver includes:
- a plurality of circuit films connected to each of the plurality of connection portions;
- a plurality of data driving integrated circuits packaged in each of the plurality of circuit films; and
- a printed circuit board connected to the plurality of circuit films.

20. The display apparatus of claim 13, further comprising an upper polarizing film and/or the stereoscopic optical member attached to the upper surface of the upper substrate except the sub display region.

* * * * *